(12) United States Patent
Marcinkowski et al.

(10) Patent No.: US 11,900,933 B2
(45) Date of Patent: Feb. 13, 2024

(54) USER-CUSTOMIZABLE AND DOMAIN-SPECIFIC RESPONSES FOR A VIRTUAL ASSISTANT FOR MULTI-DWELLING UNITS

(71) Applicant: EDST, LLC, Lubbock, TX (US)

(72) Inventors: Dave Marcinkowski, Lubbock, TX (US); Shawn Massie, Lubbock, TX (US)

(73) Assignee: EDST, LLC, Lubbock, TX (US)

( * ) Notice: Subject to any disclaimer, the term of this patent is extended or adjusted under 35 U.S.C. 154(b) by 61 days.

(21) Appl. No.: 17/379,974

(22) Filed: Jul. 19, 2021

(65) Prior Publication Data

US 2022/0351722 A1 Nov. 3, 2022

Related U.S. Application Data

(60) Provisional application No. 63/182,174, filed on Apr. 30, 2021.

(51) Int. Cl.

| | |
|---|---|
| *G10L 15/22* | (2006.01) |
| *G10L 15/06* | (2013.01) |
| *G06F 40/20* | (2020.01) |
| *G06F 40/40* | (2020.01) |
| *G06F 16/33* | (2019.01) |
| *G06F 3/04842* | (2022.01) |
| *G06N 20/00* | (2019.01) |

(52) U.S. Cl.
CPC .......... *G10L 15/22* (2013.01); *G06F 3/04842* (2013.01); *G06F 16/3344* (2019.01); *G06F 40/20* (2020.01); *G06F 40/40* (2020.01); *G06N 20/00* (2019.01); *G10L 15/063* (2013.01); *G10L 2015/0633* (2013.01); *G10L 2015/225* (2013.01)

(58) Field of Classification Search
None
See application file for complete search history.

(56) References Cited

U.S. PATENT DOCUMENTS

| | | | | |
|---|---|---|---|---|
| 2013/0253940 | A1* | 9/2013 | Zziwa | G16Z 99/00 705/2 |
| 2013/0268490 | A1* | 10/2013 | Keebler | G06F 16/954 707/627 |

(Continued)

*Primary Examiner* — Ryan Barrett
(74) *Attorney, Agent, or Firm* — Norton Rose Fulbright US LLP

(57) ABSTRACT

The present disclosure provides systems, methods, and computer-readable storage devices for enabling user management and control of responses of a virtual assistant for use in responding to questions related to multi-dwelling units without requiring reprogramming of the virtual assistant. To illustrate, a question to be answered by a virtual assistant may be received, and one or more responses to the question may be retrieved from a response database for the virtual assistant. A user interface (UI) may be provided that indicates the one or more responses. A user-selected response may be received via the UI, the user-selected response including a selected response from the one or more responses or a user-created response. An entry in the response database may be updated based on the user-selected response and a priority associated with the entry may be set, such as by increasing the priority based on user selection of the response.

19 Claims, 7 Drawing Sheets

(56) References Cited

U.S. PATENT DOCUMENTS

| | | | | |
|---|---|---|---|---|
| 2015/0186156 | A1* | 7/2015 | Brown | H04L 51/02 |
| | | | | 715/706 |
| 2016/0308795 | A1* | 10/2016 | Cheng | H04L 51/02 |
| 2018/0316636 | A1* | 11/2018 | Kamat | H04L 51/046 |
| 2019/0103101 | A1* | 4/2019 | Danila | G10L 25/51 |
| 2019/0103104 | A1* | 4/2019 | Nicholls | G06F 40/35 |
| 2019/0340527 | A1* | 11/2019 | Liden | G06F 3/04817 |
| 2020/0003448 | A1* | 1/2020 | Schwegler | F24F 11/39 |
| 2020/0019610 | A1* | 1/2020 | Agarwal | G06N 3/084 |
| 2020/0137230 | A1* | 4/2020 | Spohrer | H04M 7/0027 |
| 2020/0143405 | A1* | 5/2020 | Tucker | G06F 21/10 |
| 2020/0175114 | A1* | 6/2020 | Dechu | G06F 16/367 |
| 2020/0184155 | A1* | 6/2020 | Galitsky | G06F 40/279 |
| 2020/0227026 | A1* | 7/2020 | Rajagopal | G06F 16/244 |
| 2021/0026890 | A1* | 1/2021 | Katayama | G06F 16/958 |
| 2021/0117893 | A1* | 4/2021 | Sohum | G06Q 30/0613 |
| 2021/0232613 | A1* | 7/2021 | Raval Contractor | G06N 5/02 |
| 2022/0253608 | A1* | 8/2022 | Khanna | G16H 10/20 |
| 2022/0276882 | A1* | 9/2022 | Bradfield | G06F 16/951 |
| 2023/0274089 | A1* | 8/2023 | Tunstall-Pedoe | G06F 40/40 |
| | | | | 704/2 |

\* cited by examiner

200

First Entry 202

Response: "The property has a 100 square foot pool." 204

Priority: 1/3 206

Training Phrases: "is there a pool", "size of pool", "how many pools", "outdoor amenities" 208

Summary: Pool Information 210

Related Properties: The Estate on Main, Grove View Apartments 212

Approval Flag: off 214

Second Entry 220

Response: "There is one pool." 222

Priority: 2/3 224

Training Phrases: "is there a pool", "how many pools", "outdoor amenities" 226

Summary: Pool Information 228

Related Properties: The Estate on Main, Grove View Apartments, Sunrise Condos, The Ranch 230

Approval Flag: on 232

• • •

Nth Entry 240

Response: "Pet fees are $100 per pet for up to 3 pets." 242

Priority: 1/2 244

Training Phrases: "pets allowed", "how many pets", "pet fees", "pet friendly" 246

Summary: Pet Policy 248

Related Properties: Grove View Apartments, First Street Lofts, Sunrise Condos 250

Approval Flag: on 252

*FIG. 2*

USER-CUSTOMIZABLE AND DOMAIN-SPECIFIC RESPONSES FOR A VIRTUAL ASSISTANT FOR MULTI-DWELLING UNITS

CROSS-REFERENCE TO RELATED APPLICATIONS

The present application claims the benefit of U.S. Provisional Patent Application No. 63/182,174, filed on Apr. 30, 2021, and titled "USER-CUSTOMIZABLE AND DOMAIN-SPECIFIC RESPONSES FOR A VIRTUAL ASSISTANT FOR MULTI-DWELLING UNITS", the disclosures of which are incorporated by reference herein in their entirety.

TECHNICAL FIELD

The present application is generally related to the technical field of virtual assistants for responding to questions related to multi-dwelling units, and more particularly, but not by way of limitation, to systems that support user-customizable and domain-specific responses for such virtual assistants.

BACKGROUND

Artificial intelligence (AI) technology and applications have experienced a remarkable pace of research and growth. For example, the applications of AI have been explored in a variety of contexts, such as data forecasting, automated vehicles, natural language processing, anomaly detection, and many others. One branch of AI applications that have been embraced by tech-savvy companies AI-based conversational interfaces, which enable an automated interface between a customer and a computer system of a company instead of an interface between the customer and a human employee. Such conversational interfaces may enable the customer to discover information stored at the company system in a more natural, human way than less sophisticated technology, such as using a web browser to display contents of a database and enable access to the materials via mouse or touchscreen movements, queries, and the like. Instead, conversational interfaces may enable a user to learn information by asking questions and providing replies, and the AI-based conversational interfaces may provide responses or ask questions in order to provide the user with relevant information or direct them to additional resources. Depending on the implementation details of the conversational interface, the conversing between the user and the interface may be performed via text, speech and audio, gestures, animated or multimedia displays, or other techniques. As an example, a user of a computer may type questions using a keyboard, and the corresponding responses may be displayed on a monitor. As another example, a user of a mobile phone may speak a question that is captured by a microphone of the mobile phone, and the response may be provided as synthesized speech output by a speaker of the mobile phone, optionally in combination with an avatar or other visual information on a display of the mobile phone.

Two illustrative examples of conversational interfaces are known as "chatbots" and "virtual assistants." Chatbots typically refer to AI-based computer programs that acquire information from a user, such as product information for providing to human technical support technician, or that provide information to a user, such as an automated call-routing program. For example, a customer of an insurance company may be provided with access to a chatbot that is configured to ask questions about the customer's insurance policy and reason for contacting the insurance company in order to route the customer to the appropriate employee or information source. Virtual assistants typically refer to AI-based computer programs that perform activities to assist in conducting business or managing day-to-day schedules, such as reminding a user of a meeting, managing a to-do list, recording notes, managing smart device settings, and the like. For example, a virtual assistant may be executed by a mobile phone to enable a user to provide voice commands to call a particular phone number, to hear a reading of events scheduled today in a calendar stored at the mobile phone, to adjust a temperature setting of a smart thermostat in their home, and the like. In some literature, virtual assistants are considered as more advanced than chatbots due to the virtual assistants' ability to interact with other applications and perform activities beyond responding to questions or requests for information, and some virtual assistants' emotional and contextual understanding. However, such distinctions are largely cosmetic, as the AI technology underlying both chatbots and virtual assistants is similar, and as technology advances and customer requirements increase in specificity, chatbots are being designed to provide more options with greater context and emotional sensitivity further blurring the lines between chatbots and virtual assistants. Accordingly, conversational interfaces are increasingly being referred to interchangeably as chatbots or virtual assistants.

One problem with virtual assistants (e.g., conversational interface, chatbots, etc.), is that designing and configuring virtual assistants can be complicated and time consuming, often requiring significant time by experienced computer programmers or software engineers. As many companies that could benefit from virtual assistants do not have access to these resources, the companies may contract with a developer to provide a virtual assistant tailored to their specific requirements. To design a customer-specific virtual assistant, the developer generates the responses to be provided by the virtual assistant and links them to the questions that prompt the responses, often through specific coding and/or generation of database entries. If the customer's relevant information is not obvious to the developer, the customer must communicate to the developer the information to be covered by the virtual assistant's responses, which can be time-consuming, result in sharing of private or confidential information, and be prone to human error. Additionally, once the virtual assistant is designed and generated, the functionality of the virtual assistant is difficult or impossible to modify without skill in computer programming or database maintenance. If the customer desires to add new questions or responses, or change the linking between questions or responses, such as due to updated information, changes to a customer's business, or the like, the customer must invest in learning the technology or rehire the developer, which can increase cost and reduce utility associated with the virtual assistant.

BRIEF SUMMARY

Aspects of the present disclosure provide systems, methods, devices, and computer-readable storage media that support user management and customization of responses for virtual assistants (e.g., conversational interfaces, chatbots, etc.) configured to respond to questions related to multi-dwelling units (MDUs). The management and customization of response may be facilitated by a user interface (UI), such as a graphical user interface (GUI), that enables a user to select or modify and cause storage of responses for virtual assistants without requiring computer code of the virtual assistant to be modified, such as by a computer programmer or software engineer. A user, such as a manager of one or more MDUs, may access the GUI to select a response (e.g., from stored responses) or enter a new response to a question that may be asked of the virtual assistant, and the system may store and prioritize the user-selected or user-created response accordingly. Thus, the system may perform semi-automated management and customization of virtual assistant responses without requiring rewriting of computer code of the virtual assistant. The system may also leverage artificial intelligence and machine learning to extract responses to domain-specific questions from an input document with little to no user input.

To illustrate, a server (or other computing device) may enable display of a GUI to a user (e.g., a manager of one or more MDUs). The user may enter a question to be answered by a virtual assistant (e.g., a text-based virtual assistant, an audio-based virtual assistant, a multimedia-based virtual assistant, or a combination thereof). The server may retrieve one or more responses from a response database of virtual assistant responses for display via the GUI. If the responses have been previously prioritized (e.g., for the one or more MDUs), the responses may be presented in order of priority. The user may select one of the presented responses or may enter a user-created response, and the server may store the user-selected response (e.g., a selected response or a newly created response) in the response database in association with the question. The server may also set a priority of the user-selected response to a highest priority (or other indicated priority) of other responses associated with the user (or the one or more MDUs) and the question. In some implementations, if the user enters a user-created response, the server may initiate an approval process for the user-created response, and if the user-created response is approved, the server may store the user-created response as a response to the question for other users (or MDUs), pending permission from the user. During execution of a virtual assistant, the virtual assistant may, in response to receiving the question as a query, retrieve the user-selected response for providing as an answer to the query. In this manner, responses provided by virtual assistants may be dynamically modified based on user input without requiring programmers or developers to reprogram the virtual assistant or modify the response databases.

In some implementations, the server may determine domain-specific information for use by the virtual assistant based on a document. For example, a user may access the GUI and indicate a document from which information is to be derived for use in generating responses for the virtual assistant. Alternatively, the server may retrieve the document based on user profile information or MDU profile information associated with the user. The server may provide the document (or information based on the document) and one or more domain-specific questions to one or more machine learning (ML) models, such as neural networks, that are configured to determine responses to domain-specific questions based on input document(s). As an illustrative example, the document may be a common area policy for an apartment complex, and the domain-specific questions may include questions about what hours common areas are available, are guests allowed in common areas, are reservations needed for common areas, and the like. The one or more ML models may also be configured to generate training phrase(s) associated with the responses, the training phrases for use in indexing or categorizing the responses in the response database further training the one or ML models, or both. In some implementations, the one or more ML models may include multiple sets of ML models that are each configured to output respective responses and respective accuracy scores, and the responses associated with the highest accuracy score (or with accuracy score(s) that satisfy a threshold) may be selected for storing or use by the server. The responses (and training phrases) output by the ML models may be stored at the response database for use by the virtual assistant.

The present disclosure describes systems, methods, apparatus, and computer-readable media that provide benefits compared to conventional virtual assistants. For example, the systems described herein enable dynamic management and customization of responses for use by virtual assistants, particularly virtual assistants used to answer questions related to MDUs or other properties. The systems and methods described herein may enable an entity, such as an owner or manager of an MDU to provide customized virtual assistant support to customers without requiring the costs and computer expertise needed to reprogram a virtual assistant or program and manage a response database. Additionally, the systems and methods described herein provide for approval and use of user-created entries from a particular user by other users. By incorporating user-created responses (after approval) into a response pool for other users, an entity that offers virtual assistant management and customization to clients may be able to provide more relevant responses without requiring the entity to learn details of the domains of questions and responses used by the clients. Additionally, artificial intelligence and machine learning may be leveraged to enable automated generation of responses from input documents, thereby enabling creation of relevant, specific responses with reduced (or eliminated) user input.

According to one aspect, a method for dynamic management of responses for a virtual assistant associated with management of multi-dwelling units (MDUs) is described. The method includes receiving, by one or more processors, an indication of one or more MDUs for which the virtual assistant is configured to provide responses to questions. The method also includes receiving, by the one or more processors, a question to be answered by the virtual assistant. The method includes retrieving, by the one or more processors, one or more responses to the question from a database of responses for virtual assistants associated with management of MDUs. The method also includes providing, by the one or more processors, a user interface (UI) that indicates the one or more responses. The method includes receiving, by the one or more processors, a user-selected response based on providing the UI. The user-selected response includes a selected response from the one or more responses or a user-created response. The method also includes updating, by the one or more processors, an entry in the database based on the user-selected response. The entry includes the user-selected response and an indication of the question. The method further includes setting, by the one or more processors, a priority associated with the entry.

According to another aspect, a system for dynamic management of responses for a virtual assistant associated with management of MDUs is described. The system includes at least one memory storing instructions and one or more processors coupled to the at least one memory. The one or more processors are configured to execute the instructions to cause the one or more processors to receive an indication of one or more MDUs for which the virtual assistant is configured to provide responses to questions. The one or more processors are also configured to receive a question to be answered by the virtual assistant. The one or more processors are configured to retrieve one or more responses to the question from a database of responses for virtual assistants associated with management of MDUs. The one or more processors are also configured to provide a UI that indicates the one or more responses. The one or more processors are configured to receive a user-selected response based on providing the UI. The user-selected response includes a selected response from the one or more responses or a user-created response. The one or more processors are also configured to update an entry in the database based on the user-selected response. The entry includes the user-selected response and an indication of the question. The one or more processors are further configured to set a priority associated with the entry.

According to another aspect, a computer program product is described that includes a computer-readable storage device, such as a non-transitory computer-readable storage medium, that includes instructions that, when executed by one or more processors, cause the one or more processors to perform operations for dynamic management of responses for a virtual assistant associated with management of multi-dwelling units. The operations include receiving an indication of one or more multi-dwelling units for which the virtual assistant is configured to provide responses to questions. The operations also include receiving a question to be answered by the virtual assistant. The operations include retrieving one or more responses to the question from a database of responses for virtual assistants associated with management of multi-dwelling units. The operations also include providing a user interface (UI) that indicates the one or more responses. The operations include receiving a user-selected response based on providing the UI. The user-selected response includes a selected response from the one or more responses or a user-created response. The operations also include updating an entry in the database based on the user-selected response. The entry includes the user-selected response and an indication of the question. The operations further include setting a priority associated with the entry.

According to another aspect, a method for providing domain-specific responses to a virtual assistant associated with management of MDUs is described. The method includes obtaining, by one or more processors, a document associated with one or more MDUs for which the virtual assistant is configured to provide responses to questions. The method also includes providing, by the one or more processors, the document and one or more domain-specific questions associated with a domain corresponding to the document to one or more machine learning (ML) models to generate one or more responses and one or more training phrases associated with the one or more domain-specific questions, the one or more responses, or a combination thereof. The one or more ML models are configured to generate responses and training phrases based on input documents. The method further includes storing, by the one or more processors, the one or more responses, the one or more training phrases, or both, at a database configured to store responses for virtual assistants associated with the domain and the one or more multi-dwelling units.

According to another aspect, a system for providing domain-specific responses to a virtual assistant associated with management of MDUs is described. The system includes at least one memory storing instructions and one or more processors coupled to the at least one memory. The one or more processors are configured to execute the instructions to cause the one or more processors to obtain a document associated with one or more MDUs for which the virtual assistant is configured to provide responses to questions. The one or more processors are also configured to provide the document and one or more domain-specific questions associated with a domain corresponding to the document to one or more ML models to generate one or more responses and one or more training phrases associated with the one or more domain-specific questions, the one or more responses, or a combination thereof. The one or more ML models are configured to generate responses and training phrases based on input documents. The one or more processors are further configured to store the one or more responses, the one or more training phrases, or both, at a database configured to store responses for virtual assistants associated with the domain and the one or more multi-dwelling units.

According to another aspect, a computer program product is described that includes a computer-readable storage device, such as a non-transitory computer-readable storage medium, that includes instructions that, when executed by one or more processors, cause the one or more processors to perform operations for providing domain-specific responses to a virtual assistant associated with management of MDUs. The operations include obtaining a document associated with one or more multi-dwelling units for which the virtual assistant is configured to provide responses to questions. The operations also include providing the document and one or more domain-specific questions associated with a domain corresponding to the document to one or more ML models to generate one or more responses and one or more training phrases associated with the one or more domain-specific questions, the one or more responses, or a combination thereof. The one or more ML models are configured to generate responses and training phrases based on input documents. The operations further include storing the one or more responses, the one or more training phrases, or both, at a database configured to store responses for virtual assistants associated with the domain and the one or more multi-dwelling units.

The foregoing has outlined rather broadly the features and technical advantages of the present disclosure in order that the detailed description that follows may be better understood. Additional features and advantages will be described hereinafter which form the subject of the claims of the present disclosure. It should be appreciated by those skilled in the art that the conception and specific implementations disclosed may be readily utilized as a basis for modifying or designing other structures for carrying out the same purposes of the present disclosure. It should also be realized by those skilled in the art that such equivalent constructions do not depart from the scope of the present disclosure as set forth in the appended claims. The novel features which are believed to be characteristic of the aspects of this disclosure, both as to the organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying figures, in which:

FIG. 2 is an example of a database of virtual assistant responses according to one or more aspects;

Figure 1:
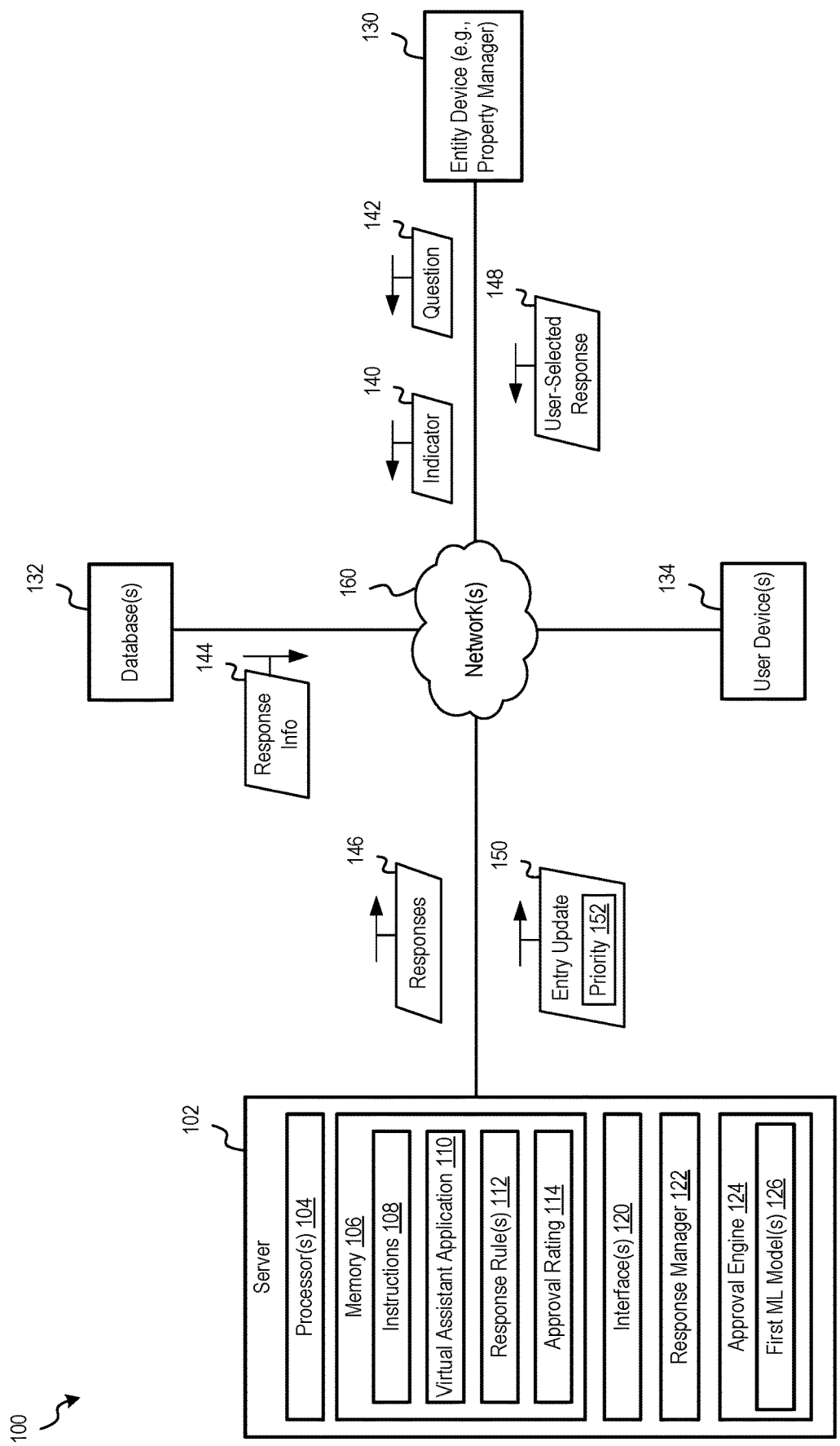
FIG. 1 is a block diagram of an example of a system that supports dynamic management of responses for a virtual assistant associated with management of multi-dwelling units (MDUs) according to one or more aspects.

Although the present disclosure and its advantages have been described in detail, it should be understood that various changes, substitutions and alterations can be made herein without departing from the scope of the disclosure as defined by the appended claims. Moreover, the scope of the present application is not intended to be limited to the particular aspects of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding aspects described herein may be utilized according to the present disclosure. Accordingly, the appended claims are intended to include within their scope such processes, machines, manufacture, compositions of matter, means, methods, or steps.

DETAILED DESCRIPTION

Inventive concepts of the present disclosure utilize a system to support user management and customization of responses for virtual assistants configured to respond to questions related to multi-dwelling units (MDUs). It may be appreciated that the subject matter described herein shifts the management of responses for virtual assistants from the developer side (e.g., computer programmers) to the client side (e.g., an entity for which the virtual assistant is developed). As used herein, a virtual assistant may refer to any type of program, application, or the like, that is configured to receive questions or requests from user input and to automatically respond to the questions or requests with one or more predefined responses. The term virtual assistant may be used herein interchangeably to refer to virtual assistants, chatbots, conversational interfaces, or any similar type of artificial intelligence (AI) application. The virtual assistants may be text-based, audio-based, animated, avatars, multi-media-based, or any combination thereof. The management and customization of responses for the virtual assistant may be facilitated by a user interface (UI) configured to enable a user to select or modify and cause storage of responses for virtual assistants. These responses may be stored in one or more response databases that are designated for use by virtual assistant(s) to retrieve responses. Thus, the systems and methods of the present disclosure support dynamic management and customization of virtual assistant responses without requiring computer code of the virtual assistant to be modified, such as by a computer programmer or software engineer. The present disclosure also utilizes a system to support automated or semi-automated generation of responses for virtual assistants configured to respond to questions related to MDUs. To illustrate, the system may leverage artificial intelligence and machine learning to extract responses to domain-specific question(s) from input document(s) with little to no user input. Thus, a user of the system may provide highly relevant, specific information to customers via virtual assistants based on paper or electronic documents without requiring the user to read the documents, derive responses from the documents, and manually enter the derived responses. Although described herein in the context of responses for virtual assistants configured for use by managers of MDUs, the disclosure is not so limited, and implementations described herein may be used to improve management, customization, and generation of responses for virtual assistants configured to operate in other contexts, such as government, health, corporate, sales, media streaming, entertainment and gaming, or other contexts, as non-limiting examples.

Certain units described in this specification have been labeled as modules in order to more particularly emphasize their implementation independence. A module is "[a] self-contained hardware or software component that interacts with a larger system." Alan Freedman, "The Computer Glossary" 268 (8th ed. 1998). A module may comprise a machine- or machines-executable instructions. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also include software-defined units or instructions, that when executed by a processing machine or device, transform data stored on a data storage device from a first state to a second state. An identified module of executable code may, for instance, comprise one or more physical or logical blocks of computer instructions that may be organized as an object, procedure, or function. Nevertheless, the executables of an identified module need not be physically located together, but may comprise disparate instructions stored in different locations that, when joined logically together, comprise the module, and when executed by the processor, achieve the stated data transformation. A module of executable code may be a single instruction, or many instructions, and may even be distributed over several different code segments, among different programs, and/or across several memory devices. Similarly, operational data may be identified and illustrated herein within modules, and may be embodied in any suitable form and organized within any suitable type of data structure. The operational data may be collected as a single data set, or may be distributed over different locations including over different storage devices.

In the following description, numerous specific details are provided, such as examples of programming, software modules, user selections, network transactions, database queries, database structures, hardware modules, hardware circuits, hardware chips, etc., to provide a thorough understanding of the present aspects. One skilled in the relevant art will recognize, however, that aspects of the disclosure may be practiced without one or more of the specific details, or with other methods, components, materials, and so forth. In other instances, well-known structures, materials, or operations are not shown or described in detail to avoid obscuring aspects of the disclosure.

As used herein, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed aspect, the term "substantially" may be substituted with "within [a percentage] of" what is specified, where the percentage includes 0.1, 1, or 5 percent; and the term "approximately" may be substituted with "within 10 percent of" what is specified. The phrase "and/or" means and or. To illustrate, A, B, and/or C includes: A alone, B alone, C alone, a combination of A and B, a combination of A and C, a combination of B and C, or a combination of A, B, and C. In other words, "and/or" operates as an inclusive or. Similarly, the phrase "A, B, C, or a combination thereof" or "A, B, C, or any combination thereof" includes A alone, B alone, C alone, a combination of A and B, a combination of A and C, a combination of B and C, or a combination of A, B, and C.

The terms "comprise" (and any form of comprise, such as "comprises" and "comprising"), "have" (and any form of have, such as "has" and "having"), and "include" (and any form of include, such as "includes" and "including"). As a result, an apparatus that "comprises," "has," or "includes" one or more elements possesses those one or more elements, but is not limited to possessing only those one or more elements. Likewise, a method that "comprises," "has," or "includes" one or more steps possesses those one or more steps, but is not limited to possessing only those one or more steps.

Any implementations of any of the systems, methods, and article of manufacture can consist of or consist essentially of—rather than comprise/have/include—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. Additionally, the term "wherein" may be used interchangeably with "where."

Further, a device or system that is configured in a certain way is configured in at least that way, but it can also be configured in other ways than those specifically described. The feature or features of one implementation may be applied to other implementations, even though not described or illustrated, unless expressly prohibited by this disclosure or the nature of the implementations.

Referring to FIG. 1, a block diagram of an example of a system that supports dynamic management of responses for a virtual assistant associated with management of MDUs according to one or more aspects is shown and designated 100. As shown in FIG. 1, the system 100 includes a server 102, an entity device 130, one or more databases 132 (referred to herein as "the databases 132"), one or more user devices 134 (referred to herein as "the user devices 134"), and one or more networks 160. In some implementations, one or more components of the system 100 may be optional, or the system 100 may include additional components, such as additional entity devices, training devices, cloud processing or storage devices, or the like, as non-limiting examples.

The server 102 may be configured to execute, support, and maintain one or more virtual assistants for use by one or multiple entities, including an entity associated with the entity device 130. Although described as a server 102, in some other implementations, functionality described herein with reference to the server 102 may be performed by a different type of electronic device, such as a desktop computing device, a laptop computing device, a personal computing device, a tablet computing device, a mobile device (e.g., a smart phone, a tablet, a personal digital assistant (PDA), a wearable device, and the like), a virtual reality (VR) device, an augmented reality (AR) device, an extended reality (XR) device, a vehicle (or a component thereof), an entertainment system, other computing devices, or a combination thereof, as non-limiting examples. The server 102 includes one or more processors 104, a memory 106, one or more communication interfaces 120, a response manager 122, and an approval engine 124. In some other implementations, one or more of the components 122-124 may be optional, one or more additional components may be included in the server 102, or both. It is noted that functionalities described with reference to the server 102 are provided for purposes of illustration, rather than by way of limitation and that the exemplary functionalities described herein may be provided via other types of computing resource deployments. For example, in some implementations, computing resources and functionality described in connection with the server 102 may be provided in a distributed system using multiple servers or other computing devices, or in a cloud-based system using computing resources and functionality provided by a cloud-based environment that is accessible over a network, such as one of the one or more networks 160. To illustrate, one or more operations described herein with reference to the server 102 may be performed by multiple servers or a cloud-based system that communicates with one or more client or user devices, one or more entity devices, or the like.

The one or more processors 104 may include one or more microcontrollers, application specific integrated circuits (ASICs), field programmable gate arrays (FPGAs), central processing units (CPUs) having one or more processing cores, or other circuitry and logic configured to facilitate the operations of the server 102 in accordance with aspects of the present disclosure. The memory 106 may include random access memory (RAM) devices, read only memory (ROM) devices, erasable programmable ROM (EPROM), electrically erasable programmable ROM (EEPROM), one or more hard disk drives (HDDs), one or more solid state drives (SSDs), flash memory devices, network accessible storage (NAS) devices, or other memory devices configured to store data in a persistent or non-persistent state. Software configured to facilitate operations and functionality of the server 102 may be stored in the memory 106 as instructions 108 that, when executed by the one or more processors 104, cause the one or more processors 104 to perform the operations described herein with respect to the server 102, as described in more detail below. Additionally, the memory 106 may be configured to store data and information, such as a virtual assistant application 110, one or more response rules 112, and an approval rating 114. Illustrative aspects of the virtual assistant application 110, the response rules 112, and the approval rating 114 are described in more detail below.

The one or more communication interfaces 120 may be configured to communicatively couple the server 102 to the one or more networks 160 via wired or wireless communication links established according to one or more communication protocols or standards (e.g., an Ethernet protocol, a transmission control protocol/internet protocol (TCP/IP), an Institute of Electrical and Electronics Engineers (IEEE) 802.11 protocol, an IEEE 802.16 protocol, a 3rd Generation (3G) communication standard, a 4th Generation (4G)/long term evolution (LTE) communication standard, a 5th Generation (5G) communication standard, and the like). In some implementations, the server 102 includes one or more input/output (I/O) devices that include one or more display devices, a keyboard, a stylus, one or more touchscreens, a mouse, a trackpad, a microphone, a camera, one or more speakers, haptic feedback devices, or other types of devices that enable a user to receive information from or provide information to the server 102. In some implementations, the server 102 is coupled to a display device, such as a monitor, a display (e.g., a liquid crystal display (LCD) or the like), a touch screen, a projector, a VR display, an AR display, an XR display, or the like. In some other implementations, the display device is included in or integrated in the server 102.

The response manager 122 is configured to support management of responses provided by the virtual assistant application 110. In some implementations, the response manager 122 includes or corresponds to a response management module configured to manage responses provided by the virtual assistant application 110. To illustrate, the server 102 may execute the virtual assistant application 110 (e.g., one or more instructions configured to support a virtual assistant) to enable operation of a virtual assistant at one or more other devices, such as the user device 134 of the entity device 130. The virtual assistant may interact with a user to retrieve information from the user or enable the user to discover information through questioning of the virtual assistant, and communications between the server 102, the databases 132, and the other devices may support the functionality of the virtual assistant. For example, a user of the user device 134 may enter a question via the user device 134, the user device 134 may send the question to the server 102, the server 102 may retrieve a corresponding response from the databases 132, and the server 102 may provide the response to the user device 134 for output to the user. In order to support dynamic management and control of the responses, the response manager 122 may be configured to communicate with the entity device 130 to send and receive data for use in adding, modifying, or removing responses stored at the databases 132 for use by the virtual assistant application 110.

To illustrate management of the responses, the response manager 122 may be configured to receive input from the entity device 130 that indicates a question to be answered by the virtual assistant application 110, and the response manager 122 may be configured to retrieve one or more responses corresponding to the question and to the entity associated with the entity device 130 (e.g., to one or more MDUs associated with the entity). The response manager 122 may be configured to provide the retrieved responses to the entity device 130 to enable a user of the entity device 130 (e.g., a manager of the one or more MDUs) to modification of the responses, information associated with the responses (e.g., priorities), or creation of new responses. In some implementations, the response manager 122 may be configured to cause display of a graphical user interface (GUI) at the entity device 130 to facilitate the above-described operations, such as by displaying questions that the virtual assistant application 110 is configured to answer for user selection, displaying the retrieved responses corresponding to a selected question, displaying priority values associated with the retrieved responses or displaying the retrieved responses in a prioritized order, displaying a user-created response, and the like. In some other implementations, other types of UIs may be used, such as audio-based UIs. The response manager 122 may be configured to receive a user-selected response (e.g., a chosen or user-created response) from the entity device 130 and to update an entry (or create a new entry) at the databases 132 that is associated with the user-selected response, such as to modify the response or the priority of the response (or to add a new user-created response as a new entry), as further described herein.

The approval engine 124 is configured to perform an approval process for a user-created response to determine whether the user-created response is to be available to other entities than the entity that created the user-created response. For example, the approval engine 124 may be configured to initiate an approval process for a user-created response received from the entity device 130 for use by the virtual assistant application 110 in responding to a particular question. In some implementations, the approval engine 124 includes or corresponds to an approval module configured to initiate an approval process for a user-created response received from the entity device 130 for use by the virtual assistant application 110 in responding to a particular question. The approval process may include analyzing the user-created response for relevance to other entities, grammar and syntax, profanity or restricted information, or the like. In some implementations, the approval engine 124 may be configured to provide the user-created response to one or more designated reviews (e.g., one or more users of the server 102). In some other implementations, the approval engine 124 may be configured to perform an automated approval process for the user-created response. For example, the approval engine 124 may be configured to leverage artificial intelligence (AI) and machine learning (ML) to implement the automated approval process. In some other implementations, the approval process may include a combination of manual review and automated review. In some implementations, the approval process may include receiving multiple approval outputs (e.g., from multiple reviewers or multiple automated review processes) and aggregating the approval outputs to determine whether or not the user-created response is approved. Additionally or alternatively, approval of the user-created response may be contingent on permission from the entity that generated the user-created response. For example, the approval engine 124 may be configured to send a request for permission to the entity device 130 and, responsive to receipt of a confirmation reply, the approval engine 124 may be configured to approve the user-created response for use with virtual assistant applications for other entities. For example, a user-created response by a manager of a particular apartment complex may include sufficiently universal information that it may be useful to managers of other apartment complexes, and thus the approval process may result in useful, relevant responses being generated for multiple entities without requiring knowledge or time spent by the operator of the server 102.

In some implementations, the approval engine 124 may include or access (e.g., at the memory 106, a storage device of the server 102, or a device that is coupled to or accessible to the server 102 via the one or more networks 160) a first set of one or more machine learning (ML) models (referred to herein as "the first ML models 126) that are configured to determine an approval rating associated with the user-created response. For example, the first ML models 126 may include a single ML model or multiple ML models that are configured to determine an approval ratings for input responses. In some implementations, the first ML models 126 may be implemented as one or more neural networks (NNs). In some other implementations, the first ML models 126 may be implemented as other types of ML models or constructs, such as support vector machines (SVMs), decision trees, random forests, regression models, Bayesian networks (BNs), dynamic Bayesian networks (DBNs), naive Bayes (NB) models, Gaussian processes, hidden Markov models (HMMs), regression models, and the like. In some implementations, the first ML models 126 may be configured to generate multiple approval ratings according to different review criteria, and the multiple approval ratings may be aggregated to determine whether the user-created response satisfies the approval process.

The entity device 130 is configured to communicate with the server 102 to enable management and customization functions associated with the virtual assistant application 110. For example, the entity device 130 may be configured to output a UI that enables a user of the entity device 130 to input a question to be answered by the virtual assistant application 110 and to manage responses corresponding to the question, such as by ordering or prioritizing the responses, adding one or more additional responses, modifying one or more existing responses, deleting one or more responses, setting or adjusting parameters or configurations associated with the virtual assistant application 110, or a combination thereof. The entity device 130 may include or correspond to a mobile device (e.g., a smart phone, a tablet, a PDA, a wearable device, and the like), a desktop computing device, a laptop computing device, a personal computing device, a tablet computing device, a server, a VR device, an AR device, an XR device, a vehicle (or a component thereof), an entertainment system, other computing or electronic devices, or a combination thereof, as non-limiting examples. The entity device 130 may be associated with an entity. For example, the entity device 130 may be associated with (e.g., owned, maintained, or used by) a manager of one or more MDUs. To further illustrate, the entity device 130 may be a computer used by a company that leases multiple apartment complexes in one or more geographic regions, as a non-limiting example. Although one entity device 130 is shown in FIG. 1, in some other implementations, additional entity devices associated with other entities, the same entity that is associated with the entity device 130, or both, may be included in the system 100.

The databases 132 (e.g., one or more response databases) are configured to store responses for use by the virtual assistant application 110 and/or other virtual assistant applications provided to the entity associated with the entity device 130 or other entities. The responses may include text data, image data, combinations of text and image data (e.g., electronic document data), audio data, multimedia data, or any other type of data that may be provided by virtual assistant applications. The databases 132 may be configured to store entries that include responses for use by the virtual assistant applications and information associated with the responses, such as priority indicators, training phrase(s), summaries, links to related users, MDUs, or domains, approval flags, and the like. Some entries may be stored in the databases 132 during design and generation of the virtual assistant applications, and some entries may be stored in the databases 132 by the server 102 or entity devices (e.g., the entity device 130) during the operational lifetime of the virtual assistant applications. Although illustrated in FIG. 1 as a single database, in some other implementations, the databases 132 include multiple communicatively coupled databases. In some implementations, each of the databases 132 may be configured to store a particular type of responses. For example, each of the databases 132 may be configured to store responses that correspond to different entities, responses the correspond to different MDUs, responses that correspond to different types of MDUs, responses that correspond to different virtual assistant applications, responses that correspond to different questions or types of questions, or the like.

The user device 134 is configured to communicate with the server 102 to execute the virtual assistant application 110. For example, the user device 134 may be configured to provide a virtual assistant to a user by sending and receiving data to and from the server 102, such as sending questions or requests to be answered by the virtual assistant and receiving responses to be output at the user device 134. To further illustrate, the user device 134 may execution an instance of the virtual assistant application 110 to display a graphical user interface (GUI) that displays text corresponding to the questions, the responses, or both, images corresponding to the questions, the responses, or both, animation or video that corresponds to the questions, the responses, or both, other information, or a combination thereof. Additionally or alternatively, the user device 134 may render audio output, such as synthesized speech, that corresponds to the questions, the responses, or both, other information, or a combination thereof. As an illustrative example, the virtual assistant application 110 may be a virtual assistant for residents of the one or more MDUs managed by the entity associated with the entity device 130, and the user device 134 may enable a user to ask questions to obtain information related to the one or more MDUs or to initiate performance of one or more actions with respect to the one or more MDUs. The user device 134 may include or correspond to a mobile device (e.g., a smart phone, a tablet, a PDA, a wearable device, and the like), a desktop computing device, a laptop computing device, a personal computing device, a tablet computing device, a server, a VR device, an AR device, an XR device, a vehicle (or a component thereof), an entertainment system, other computing or electronic devices, or a combination thereof, as non-limiting examples. The user device 134 may be operated by a customer/client or potential customer/client of an entity. For example, the user device 134 may be associated with a resident of the one or more MDUs managed by the entity associated with the entity device 130, or with a prospective resident that is interested in obtaining information about the one or more MDUs. Although one user device 134 is shown in FIG. 1, in some other implementations, additional user devices associated with other current (or prospective) residents, lessees, tenants, renters, occupants, etc., of MDUs managed by the same entity that is associated with the entity device 130, other entities, or both, may be included in the system 100.

During operation of the system 100, the server 102 may execute the virtual assistant application 110 to provide virtual assistant services to one or more other devices, such as the user device 134. The virtual assistant application 110 may correspond to the entity associated with the entity device 130 and may be provided to current and prospective customers of the entity. As a non-limiting example, the entity may manage one or more MDUs, and the virtual assistant application 110 may be configured to provide a virtual assistant for current or prospective occupants (e.g., renters, lessees, tenants, etc.) of the one or more MDUs to provide information related to the one or more MDUs, to enable performance of one or more operations associated with the one or more MDUs, or a combination thereof. In this example, the entity may be a property manager of multiple apartment complexes, and the virtual assistant application 110 may be configured to provide text-based, audio-based, image or video-based, multimedia-based, or a combination thereof, virtual assistant functionality to enable access to information about the apartment complexes, such as floorplans of various units, monthly rents for various units, rules regarding use of common areas, details of leases, and the like, and/or to enable performance of one or more activities, such as contacting the property manager, initiating electronic rent payment, scheduling a virtual tour of the apartment complexes, and the like. MDUs are properties that typically include multiple separate units within the same building or complex. Some MDUs (also referred to as multi-family residential units (MFRUs)) include multiple different housing or residential units in one or more buildings. Illustrative examples of such MDUs include apartment buildings, mixed use buildings, condominiums, flats, lofts, housing cooperatives (co-ops), penthouses, townhouses, single room occupancies (SROs), studio apartments, tenements, or the like. Other types of MDUs include student housing (e.g., dorms, co-ops, student apartments, etc.), planned communities including combined commercial and residential structures (e.g., mixed use buildings that include store(s), restaurants, and the like in one or more floors or units and apartments, condos, and the like in one or more other floors or units), hotels, boarding houses, military properties (e.g., barracks, etc.), assisted living buildings or communities, hospice or medical treatment buildings or communities, and the like. Although MDUs can sometimes refer to residential properties, the aspects described herein are not limited to residential properties and may be readily applied to other types of properties, such as commercial properties (e.g., office spaces, warehouses, storage units, malls, and the like). Accordingly, it is to be understood that aspects of the present disclosure are not limited to use with multi-family residential properties.

To further illustrate the functionality of the virtual assistant application 110, a user of the user device 134 may access the virtual assistant, such as by causing a browser executed at the user device 134 to access a website of the entity (or a particular MDU managed by the entity) or by executing an application provided by the entity, which may cause the user device 134 to display a GUI that includes an option for inputting a question (e.g., via text, via speech, etc.) to be answered by the virtual assistant and other information associated with one or more MDUs managed by the entity. The server 102 may receive the question from the user device 134, and an indication of the entity or the MDU, and the server 102 may retrieve one or more responses from the databases 132 that correspond to the question and the indication. For example, the virtual assistant may request the user to enter the name of the entity or the MDU, the user device 134 may provide the internet address accessed by the browser, the user device 134 may provide an identifier associated with the application, the server 102 may access a user profile of the user to determine the indication, or the indication may be obtained by the server 102 in some other manner. As an illustrative example of implementation of the virtual assistant application 110, the user of the user device 134 may be a resident of an apartment at a particular MDU (e.g., "Sunnyside Apartments") managed by the entity, and the user may enter the question "Are pets allowed at Sunnyside Apartments?" In this example, the server 102 may access the databases 132 based on the question and the indication of Sunnyside Apartments to retrieve two responses linked with the question, which are provided by the server 102 to the user device 134 for outputting to the user. To further illustrate, the GUI at the user device 134 may display the following text: "The pet policy for Sunnyside Apartments may be found here: <link>", where "<link>" is a link (e.g., a uniform resource locator (URL)) to a copy of an electronic document for the pet policy. The GUI may also display a configurable option for updating a user profile to indicate the presence of a pet (which may be used by the entity device to add a pet fee to a monthly rent, or for other purposes). The question may be linked with different responses for different MDUs of the entity. For example, if the entity manages three MDUs, the databases 132 may store at least three entries that include unique entries associated with each of the three MDUs (e.g., a first entry containing a response to the question for residents of Sunnyside Apartments, a second entry containing a response to the question for residents of a second MDU, etc.). Alternatively, the question may be linked to a single response, or at least two MDUs may be linked to the same response. For example, if the question is "What is the mailing address for rent checks?", the database 132 may store a single entry containing a response because rent checks for each of the MDUs are to be mailed to the same address. In some implementations, the databases 132 may store entries for more than one entity, and one or more of the entries may be linked to multiple entities. For example, an entry that contains a response to a general question about apartments that is not specific to any particular location or manager may be linked to multiple entities that each manage at least one respective apartment complex. Thus, the virtual assistant application 110 may enable users to obtain a variety of general to specific information by asking questions instead of using a GUI to navigate a database or using a browser to access multiple different resources that may or may not contain the information desired by the user.

Although the responses stored in the databases 132 at the time the virtual assistant application 110 is designed may provide useful and relevant information to users, such responses may become less informative or outdated after a particular period of time. Additionally or alternatively, new policies, changes to the MDUs, new leases, frequently asked questions, and the like, may render some responses obsolete or incorrect, as well as benefiting from new information being provided by the virtual assistant application 110. Thus, dynamic management of the responses stored in the databases 132 may provide significant benefits to the entity for which the virtual assistant application 110 is designed.

To support dynamic management of responses for use by the virtual assistant application 110, the server 102 may communicate with the entity device 130 to cause output of a UI, such as a GUI, an audio-based UI, or the like, that enables the entity to dynamically modify and prioritize responses used by the virtual assistant application 110, as well as adding new responses to be used by the virtual assistant application 110. An illustrative example of such a GUI is further described below with reference to FIG. 3. The UI may prompt the entity to enter a question that the virtual assistant application 110 is configured to answer, and responsive to user input, the entity device 130 may provide (e.g., send or transmit, such as via the one or more networks 160) an indicator 140 and a question 142. The indicator 140 may identify or indicate the entity or one or more MDUs for which a response to the question 142 is to be provided. For example, the indicator 140 may include a name or other identifier of a particular MDU (e.g., based on user input) or an entity identifier or entity profile associated with the entity, a device identifier associated with the entity device 130, other information, or a combination thereof, any of which may be mapped to one or more MDUs by information stored at or accessible to the server 102. As an illustrative example, the indicator 140 may include a link (or information representative of the link) accessed by a browser of the entity device 130 to enable management of responses for one or more particular MDUs. As another illustrative example, the indicator 140 may be an entity identifier stored in a profile associated with the entity of the entity device 130. Although illustrated as separate information in FIG. 1, the indicator 140 and the question 142 may be included in the same or different messages from the entity device 130.

After receiving the indicator 140 and the question 142, the response manager 122 (e.g., the server 102) may retrieve response information 144 from the database 132 based on the indicator 140 and the question 142. For example, the response manager 122 may query the databases 132 for responses that correspond to the question 142 and to the MDUs or entity associated with the indicator 140, and the databases 132 may provide (e.g., send or transmit, such as via the one or more networks 160) the response information 144 to the server 102. The response information 144 may include one or more responses that correspond to the question 142 and to the MDUs associated with the indicator 140, and information associated with the one or more responses, such as priority values or training phrases, as non-limiting examples. The additional information may be stored in entries at the databases 132. An illustrative example of information stored at the databases 132 is further described below with reference to FIG. 2.

Based on receiving the response information 144, the response manager 122 may provide (e.g., send or transmit, such as via the one or more networks 160) responses 146 to the entity device 130 for output to the entity by a UI at the entity device 130. The responses 146 may include one response or multiple responses, depending on the number of responses that correspond to the question 142 and to the MDUs or the entity associated with the indicator 140. In some implementations, the responses 146 may include additional information, such as priority information or training phrases, as non-limiting examples. For example, if the responses 146 include multiple responses, the responses 146 may include associated priority values or ranks, or the responses 146 may be formatted in a particular order based on the prioritized values (e.g., the responses 146 may be a string or list of responses in a priority-based order). After receiving the responses 146, the entity device 130 may output the responses 146 to the entity. For example, the entity device 130 may display the responses 146 or may output the responses 146 as synthesized speech. In some implementations, the entity device 130 may display or output the responses 146 in a particular order (e.g., a prioritized order). Additionally or alternatively, the entity device 130 may display or output the additional information, such as displaying or outputting priority values or scores, or training phrases associated with the responses 146. Training phrases may be used as additional phrases for matching an input of a user of the virtual assistant application 110 to a corresponding response. For example, if the question 142 is "How many square feet is the living room in a one-bedroom apartment?" and one of the responses 146 is "The living room in a one-bedroom apartment is 450 square feet," this response may be associated with the training phrases "living room size," "living room area," "how big is living room," and the like, such that the virtual assistant application 110 is able to provide the response to questions that do not exactly match the question 142, but that still represent a request for the same information. Although described as the entity device 130 providing questions which the entity desires to manage and for which the responses 146 are retrieved, in some other implementations, the response manager 122 may provide questions, and associated responses, that have been flagged by users of the virtual assistant applications 110 as being incorrect, not particular useful, or otherwise not informative, so that the entity may modify responses that do match the intent of the questions that trigger the responses.

Via interactions with the UI at the entity device 130, the entity may modify one or more of the responses 146, or information associated with one or more of the responses 146. Additionally or alternatively, the entity may create a new response to be stored at the databases 132 and used by the virtual assistant application 110 to respond to the question 142. To illustrate, the entity device 130 may receive user input that indicates selection of one of the responses 146 or a user-created response, and the entity device 130 may provide the selected response or the user-created response to the server 102 as a user-selected response 148. The user-selected response 148 may include text of the respective response, information associated with the respective response, or a combination thereof. For example, the user-selected response 148 may include response text (e.g., modified text for a retrieved response or new text for a user-created response), information associated with the response (e.g., a priority value associated with the response, one or more training phrases associated with the response, other information, etc.), or both. In some implementations, the user-selected response 148 may include multiple responses, such as multiple modified responses, multiple user-created responses, updated or modified priority values associated with multiple retrieved responses, or the like. Although described as being generated based on user input, in some other implementations, the user-selected response may be generated based on extractions from a document, as further described below with reference to FIG. 4.

After receiving the user-selected response 148, the response manager 122 may update an entry in the databases 132 based on the user-selected response 148. To illustrate, the response manager 122 may generate and provide an entry update 150 to the databases 132. Generating the entry update 150 may include setting a priority 152 associated with the entry. In some implementations, the entry update 150 may include or indicate a response (e.g., the user-selected response 148) and optionally, information associated with the response, such as the priority 152, the entity or MDUs the correspond to the response, one or more training phrases that correspond to the response, other information, or a combination thereof, as further described below with reference to FIG. 2. The databases 132 may receive the entry update 150 and update (e.g., modify or create) an entry in the databases 132 that corresponds to the response indicated by the entry update 150. For example, if the entry update 150 indicates a previously-stored response, an existing entry in the databases 132 may be updated to include the response text, to set a priority value based on the priority 152, or to perform other modifications or updates on fields or portions of the existing entry. As another example, if the entry update 150 indicates a user-created response, a new entry may be created in (e.g., added to) the databases 132. This new entry may include the user-created response, the priority 152, additional information, or a combination thereof. The entries may be associated with the entity or the MDUs managed by the entity (e.g., based on an identifier of the entity or the MDUs received from the entity device 130 or determined by the server 102). Although described as being associated with the entity (or the MDUs), in other implementations, the entries may be associated with other information. For example, the entries may be associated with different types of leases or rental agreements available to current or potential customers, different geographic locations (e.g., due to different state regulations or local laws), different customer types (e.g., residential (short-term, long-term, or periodic), commercial, or the like), other categories, or the like.

In some implementations, the user-selected response 148 may include a priority value that is associated with the response. In such implementations, the priority 152 may be the priority value included in the user-selected response 148, and the priority value for the entry at the databases 132 is set to the priority 152. Priority values for other entries that correspond to the same question may be adjusted based on the priority 152 (e.g., entries having priority values that are less than the priority 152 may be decremented or otherwise adjusted, while entries having priority values that are greater than or equal to the priority 152 may remain the same) or may remain the same. In some other implementations, the user-selected response 148 does not include a priority value. In some such implementations, the response manager 122 may set the priority 152 to indicate a maximum value, and the priority value for the entry at the databases 132 may be set to a highest priority value associated with the question 142 and the entity or MDUs associated with the indicator 140. In some other such implementations, the response manager 122 may set the priority 152 to indicate a default value, and the priority value for the entry at the databases 132 may be set to a default value (e.g., a particular value, a lowest priority value, etc.). In either implementation, priority values for other entries associated with the question 142 and the entity or MDUs associated with the indicator 140 may be adjusted based on this adjustment or remain the same, as described above.

If the user-selected response 148 includes a user-created response, the approval engine 124 may initiate an approval process for the user-created response. The approval process may result in generation of an approval rating 114. Satisfaction of the approval process may indicate that the user-created response (e.g., the user-selected response 148) is able to be used as a response for at least one other entity. The approval process may include analyzation of the user-created response for relevance, specificity, grammar and syntax, profanity or other restricted content, or a combination thereof. The approval process may include a manual approval process, an automated (or semi-automated) approval process, or a combination of manual and automated approval.

In some implementations, the approval process may include an at least partially manual approval process. To illustrate, the approval engine 124 may provide the user-created response to device(s) associated with system administrator(s) (e.g., an entity that operates the server 102 and designs or controls the virtual assistant application 110) for manual approval by one or more response approval specialists (or other system administrators). The response approval specialists may review the response and provide user input (e.g., individual approval ratings) to the devices to indicate whether they approve the response for use with other entities. If the user-created response is provided to multiple response approval specialists, the approval engine 124 may aggregate the individual approval ratings to determine the approval rating 114. A value of the approval rating 114 that satisfies a threshold indicates that the user-created response satisfies the approval process and is approved for use for other entities. As a non-limiting example, the approval engine 124 may perform a simple majority vote based on the individual approval scores to determine the approval rating 114.

In some other implementations, the approval process may include an at least partially automated (or semi-automated) approval process. In some aspects that implement the at least partially automated approval process, the approval engine 124 may perform the approval process by applying one or more predefined response rules 112 to the user-created response. The response rules 112 may be configured enforce a variety of requirements on approved responses. As non-limiting examples, the response rules 112 may include a rule associated with a minimum or maximum response length, a rule associated with particular subject-matter requirements, a rule associated with a minimum or maximum number of different languages included in a response, a rule associated with satisfying a restricted words test, or the like. In some other aspects that implement the at least partially automated approval process, the approval engine 124 may provide the user-created response to the first ML models 126 to determine the approval rating 114. To illustrate, the approval engine 124 may perform one or more natural language processing (NLP) operations on the user-created response to generate feature data to provide as input to the first ML models 126, and based on the feature data, the first ML models 126 may output the approval rating 114. To determine the approval rating 114, the first ML models 126 may be trained using training data that is based on extracted features from approved responses and extracted features from rejected responses. In some such implementations, the first ML models 126 may include multiple different sets of ML models configured to determine approval based on different characteristics of responses, such as a first set of ML models trained based on syntactically correct and syntactically incorrect responses, a second set of ML models trained based on different degrees of specificity (or generality) associated with responses, etc. The outputs of the different sets ML models may be aggregated to generate the approval rating 114. In some aspects that implement the at least partially automated approval process, the approval engine 124 may use both the response rules 112 and the first ML models 126 to generate the approval rating 114. As an illustrative example, the approval engine 124 may apply the response rules 112 to the user-created response to generate individual approval ratings that indicate satisfaction of a restricted word test or a response length requirement in addition to providing the user-created response as input to the first ML models 126 to generate one or more individual approval ratings, and the various individual approval ratings may be aggregated to generate the approval rating 114.

In some implementations, the approval process, in addition to any of the approval processes described above, may also or alternatively require permission from the entity. To illustrate, the approval engine 124 may provide a permission request message to the entity device 130. The permission request message may indicate that the system administrator (or operator of the server 102) requests to use the user-created response with other entities (e.g., as a response provided by other virtual assistant applications). The entity may decide whether or not to grant permission to use the user-created response, and based on user input, the entity device 130 may provide an acknowledgement (or a negative acknowledgement) to the server 102. Based on which message is received, the approval engine 124 may determine the approval rating 114 (e.g., if a negative acknowledgement is received, the approval engine 124 may set the approval rating 114 as a value that indicates the user-created message is not approved). In some such implementations, entities may be provided with incentives to grant permission, and the permission request message may indicate the incentive. Alternatively, in some implementations, permission to use user-created responses for other entities may be included as a contractual obligation associated with development of the virtual assistant application 110, and the approval engine 124 does not request permission from the entity device 130.

If the approval process is satisfied (e.g., if the approval rating 114 indicates that the user-created response is approved), the approval engine may cause an entry at the databases 132 that corresponds to the user-created response to be linked to one or more other entities. For example, the approval engine 124 may include a bit or field in the entry update 150 that indicates that the response is approved for use with related entities, MDUs, or the like, or the approval engine 124 may provide a separate message that indicates the same. Based on this indication of approval, the entry that is added for the user-created response is associated with one or more other entities or MDUs. For example, a flag associated with the entry may be set to indicate that user-created response is approved (or is not approved) for use with other entities or MDUs, as further described below with reference to FIG. 2.

As an illustrative example of operation of the system 100, the entity associated with the entity device 130 may be a manager of two different apartment complexes in a particular city, and the virtual assistant application 110 may be developed with generic and detailed questions and responses related to the two apartment complexes. For example, for the question "Does the apartment have a pool?", the databases 132 may initially store a first entry associated with a first apartment complex and the question and a second entry associated with a second apartment complex and the question. The first entry may include the response "There is one pool located between buildings C and D," and the second entry may include the response "A pool is coming in 2021. Stay tuned!" Once the pool at the second apartment is built, the entity may wish to update the virtual assistant application 110 so that potential customers know there is a pool at the second apartment. Instead of requiring the entity to reprogram the virtual assistant application 110, manually edit the databases 132, or contact the developer of the virtual assistant application, the entity may use the entity device 130 to access the UI and retrieve the responses 146 that corresponds to the question 142 (e.g., "Does the apartment have a pool?") and the second apartment complex. Via the UI, the entity may modify the response to include the new text "The apartments include an Olympic size saltwater pool for the benefit of all residents" in addition to an image of the pool, and this information (e.g., the user-selected response 148) may be provided to the server 102 for updating the entry at the databases 132. In this manner, the entity may update responses used by the virtual assistant application 110 based on new information and to include detailed, highly relevant responses instead of generic responses that may not be as likely to encourage potential residents to choose the entity's apartments. Additionally, if the information of a response does not match the intent of a question, such as indicated by low user ratings, the entity may be made aware and may modify the response to provide more relevant information. For example, if the response "There is one pool between buildings C and D" is associated with the question "Are there pool tables in the lounge" due to the presence of the word "pool" in both the response and the question, the response may receive low user reviews and may be flagged for attention by the entity. The UI at the entity device 130 may display any flagged responses and the associated question and context, and the entity may modify the response to improve the utility of the response, such as by rewriting the response as "There are 2 cash-only pool tables in the lounge, as well a change machine."

As described with reference to FIG. 1, the system 100 enables dynamic management and customization of responses for use by the virtual assistant application 110 by the entity device 130. The system 100 may enable the entity, such as an owner or manager of one or more MDUs, to provide customized virtual assistant support to customers without requiring the costs and computer expertise needed to reprogram the virtual assistant application 110 or to program and manage the databases 132. Additionally, the system 100 provides for approval and use of user-created entries from a particular entity by other entities. By incorporating user-created responses (after approval) into a response pool (e.g., at the databases 132) for other entities, operator of the server 102 (e.g., the system administrator or virtual assistant service provider) may be able to provide more relevant responses without requiring time and resource costs associated with learning details of the domains of questions and responses used by the various entities for which virtual assistant applications are developed. Additionally, by enabling entities to add and customize the responses, a rollout and deployment of the virtual assistant application 110 may be simplified and more scalable as compared to other virtual assistant applications. For example, the virtual assistant application 110 may be initially set up with pre-defined responses that are more generic, or multiple responses to be selected by a respective entity, and thus the rollout and deployment of the virtual assistant application 110 to multiple different entities may be more uniform and less complex than designing specific instances of the of the virtual assistant application 110 on an entity-by-entity basis, and by supporting dynamic management of the responses, the virtual assistant application 110 is able to be customized to each entity's particular requirements, instead of a more generic "one size fits all" application.

Referring to FIG. 2, an example of a database of virtual assistant responses according to one or more aspects is shown as a database 200. Although referred to as one database, the database 200 may include a single database or multiple databases that store the information described herein. In some implementations, the database 200 may include or correspond to the databases 132 of FIG. 1.

The database 200 is configured to store entries corresponding to responses to be provided by a virtual assistant (e.g., the virtual assistant application 110 of FIG. 1), such as a virtual assistant configured to respond to questions associated with one or more MDUs. As shown in FIG. 2, the database 200 may store a first entry 202, a second entry 220, and an nth entry 240. Although three entries are illustrated in FIG. 2, in other implementations, the database 200 may store fewer than three or more than three entries. Entries in the database 200 may be added, modified, or deleted by a response manager, such as the response manager 122 of FIG. 1. In some implementations, the database 200 may be stored at a memory or storage device of a server (or other electronic device) that executes a response manager, such as the server 102 of FIG. 1. In some other implementations, the database 200 may be external to the server and accessible to the server, such as via a network. As a non-limiting example, the database 200 may be stored at a cloud-based storage platform.

The entries in the database 200 include or indicate the responses and various information associated with responses for use by the virtual assistant, such as priority values, training phrases, summaries, related properties (e.g., MDUs), and approval flags. To illustrate, the first entry 202 may include a first response 204, a first priority 206, first training phrases 208, a first summary 210, first related properties 212, and a first approval flag 214, the second entry 220 may include a second response 222, a second priority 224, second training phrases 226, a second summary 228, second related properties 230, and a second approval flag 232, and the nth entry 240 may include an nth response 242, an nth priority 244, nth training phrases 246, an nth summary 248, nth related properties 250, and an nth approval flag 252. The responses 204, 222, and 242 are responses to questions that the virtual assistant is configured to respond to. For example, the first response 204 and the second response 222 may be responses to the question "Is there a pool?", and the nth response 242 may be a response to the question "Are pets allowed in the apartment?"

The additional information in each entry is associated with the respective response. The priorities may indicate a priority of a particular response with reference to other responses associated with the same question. In the example of FIG. 2, the first priority 206 is ⅓, which indicates that there are three responses associated with the question and that the first response 204 is the highest priority. The training phrases include words or phrases that may be used to determine questions that correspond to the respective responses, such as based on NLP analysis, training ML models, or the like. In the example of FIG. 2, the first training phrases include "is there a pool", "size of pool," "how many pools," and "outdoor amenities." These phrases may be used to identify questions that are to be answered with the first response 204. For example, in addition or alternatively of being linked to the question "Is there a pool?", the first response 204 may be linked to questions such as "What size pools are there?", "How many pools does this complex have?", and "What outdoor amenities do you offer?", as non-limiting examples. The summaries include a summary of what information is included in the respective response, a summary of questions that correspond to the response, or a combination thereof. In the example of FIG. 2, the first summary 210 includes "pool information," which summarizes the first response 204. In some other implementations, the summaries may also include question-specific summaries, particular questions linked to the response, or a combination thereof, or the summaries may be omitted in favor of included such information. The related properties may indicate one or more properties, such as one or more MDUs, that are associated with the respective response. In the example of FIG. 2, the first response 204 may be associated with two MDUs: The Estate on Main and Grove View Apartments, as indicated by the first related properties 212. Thus, if a user asks the corresponding question and is associated with one of those two MDUs, the virtual assistant should return the first response 204. The approval flags may indicate whether a particular response is approved for use with other entities, MDUs, or both. The approval flags may be set based on the results of an approval process associated with the response, as described above with reference to FIG. 1. In the example of FIG. 2, the first approval flag 214 is set to an off value to indicate that the first response 204 is not to be used by other entities or MDUs. This setting may be due to the specificity of the first response 204 (e.g., that other entities or MDUs do not have 100 square foot pools), or other factors, such as the first response 204 including restricted language or an entity that created the first response 204 not granting permission to use the first response 204 with other entities or MDUs.

As seen in FIG. 2, different entries may correspond to the same or similar questions, or to different questions. To illustrate, the second response 222 may correspond to the same question as the first response 204, as shown by the similarities between the first training phrases 208 and the second training phrases 226 or the first summary 210 and the second summary 228. Additionally or alternatively, some entries may correspond to different questions. To illustrate, the nth response 242 may correspond to a different question than the first response 204, as shown by the differences between the first training phrases 208 and the nth training phrases 246 or the first summary 210 and the nth summary 248. Some entries may correspond to at least one of the same MDU. For example, the second related properties 230 include the first related properties 212 and two additional MDUs: Sunrise Condos and The Ranch. Accordingly, the first response 204 may be used as a response to the question by a user associated with The Estate on Main or Grove View Apartments, and the second response 222 may be used as a response to the question by a user associated with The Estate on Main, Grove View Apartments, Sunrise Condos, or the Ranch. However, the first response 204 has a higher priority than the second response 222 for The Estate on Main and Grove View Apartments, as indicated by the first priority 206 and the second priority 224. Additionally, the second response 222 may be used for other entities based on the second approval flag 232 having an on value (e.g., the second response 222 may have successfully completed an approval process).

The entries 202, 220, and 240 may be stored or updated based on instructions from a server, such as the server 102, that is configured to enable dynamic management of virtual assistant responses. For example, if the entry update 150 includes or indicates the first response 204, the first entry 202 may be updated with updated values for the first response 204, the first priority 206, the first training phrases 208, the first summary 210, the first related properties 212, the first approval flag 214, other information, or a combination thereof, based on information included in the entry update 150. To further illustrate, the first priority 206 may be modified based on the priority 152. In this manner, the entries 202, 220, and 240 may be stored and maintained to enable dynamic management of virtual assistant responses without requiring rewriting computer code or manually editing entries in a database.

Figure 3:
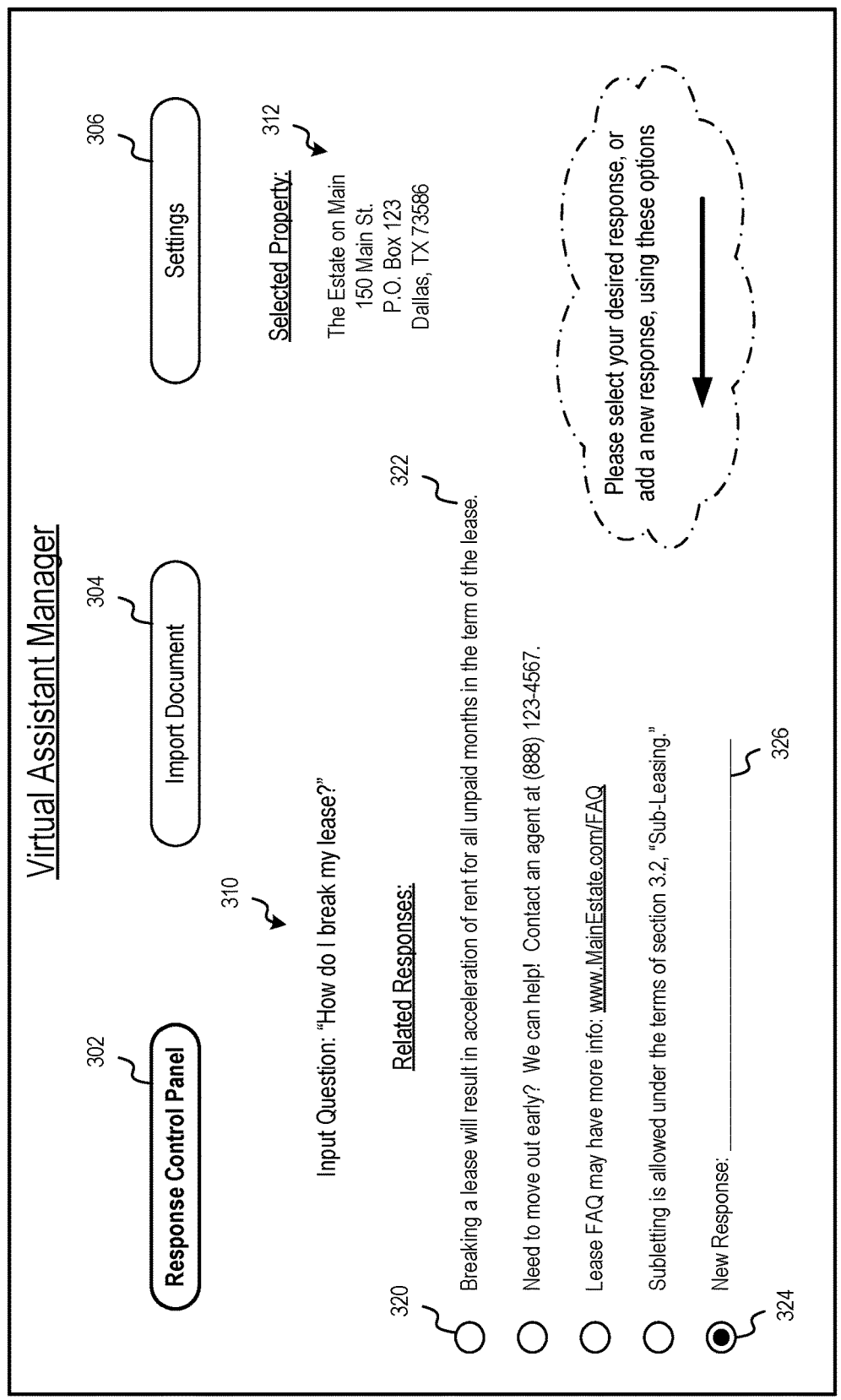
FIG. 3 is an example of a user interface that supports dynamic management of responses for virtual assistants according to one or more aspects.

Referring to FIG. 3, an example of a user interface (UI) that supports dynamic management of responses for virtual assistants according to one or more aspects is shown as a UI 300. The UI 300 (e.g., a GUI) may be displayed via a server (e.g., a display device coupled to the server, or another electronic device) that executes a response manager, an administrator device (e.g., associated with an entity such as a property manager of one or more MDUs), a user device (e.g., associated with a current or potential customer or client of the entity), or a combination thereof. In some implementations, the UI 300 may be displayed by the entity device 130 of FIG. 1. As shown in FIG. 3, the UI 300 includes a response control button 302, an import document button 304, a settings button 306, an input question 310, selected property information 312, and one or more related responses. In other implementations, one or more of the illustrated features of the UI 300 may be optional, the UI 300 may include additional features, or both.

The response control button 302 may be selectable to cause the UI to display the content shown in FIG. 3 to enable a user (e.g., an entity, such as a manager of one or more MDUs) to dynamically manage responses for a virtual assistant. The import document button 304 may be selectable to cause the UI to display information and options for generating responses based on a document, as further illustrated with reference to FIG. 5. The settings button 306 may be selectable to display information and options for controlling one or more settings of response management or document analysis, or other settings.

The input question 310 includes a question that is to be answered by the virtual assistant. For example, the virtual assistant may be configured to answer the input question 310 by retrieving one or more corresponding responses from a database and output at least one of the one or more responses. The UI 300 may include a user-configurable option that enables the user to enter the input question 310, such as via a keyboard, touchscreen, or other input device, or by speaking the question for capture by an audio capture device. In the example shown in FIG. 3, the input question 310 is "How do I break my lease?" The selected property information 312 is displayed to indicated to a user which property (e.g., MDU) is currently selected. The selected property is used in retrieving responses to the input question 310 (e.g., the retrieved responses correspond to the input question 310 and the selected property, as opposed to any property for which a response corresponds to the input question 310). In some implementations, the selected property information 312 may include a property name and address, or other information, such as a phone number, an e-mail address, a website, a social media link, an image or graphic, a combination thereof, or the like. In some implementations, the selected property information 312 may also include, or may be replaced with, entity information associated with an entity that manages the property. For example, if responses are stored in association with entities instead of properties (e.g., MDUs), the selected property information 312 may be replaced with an entity name, address, phone number, e-mail address, website, social media link, or the like. The selected property information 312 may be configurable by a user, such as via a text input, a dropdown menu, a file selection icon, or the like.

When the input question 310 is entered, the UI 300 displays responses that are associated with the input question 310 and the selected property indicated by the selected property information 312. For example, the database may store one or more responses that correspond to a particular question to be answered by the virtual assistant, and each of the one or more responses may correspond to one or more properties for which the respective response is to be used as an answer. To illustrate, in the example shown in FIG. 3, the input question 310 and the selected property correspond to four responses, which are displayed as "Related Responses." Each of the related responses include a selectable indicator and response text, such as an illustrative selectable indicator 320 and an illustrative response text 322. In some implementations, the related responses may be displayed in a particular order, such as a prioritized order based on priorities stored in the respective entries in the database. For example, an entry that stores the response text 322 ("Breaking a lease will result in acceleration of rent for all unpaid months in the term of the lease.") may have a higher priority than the other responses in the example of FIG. 3. A user may select which response should have the highest priority, should be modified, or both, by selection of the respective selectable indicator. For example, the user may select the selectable indicator 320 to decrease the priority associated with the response text 322 or to enable modification or deletion of the response text 322, as non-limiting examples. Selection of a particular response may also cause display and optionally user modification of other information related to the particular response, such as training phrases, summaries, properties to link to the response, an option to approve use of the response with other entities, or the like. Additionally or alternatively, the related responses may include a selectable indicator 324 associated with an input field 326. Upon selection of the selectable indicator 324, the user may enter a user-created response via the input field 326. Additional information may also be displayed for user creation, such as a priority, training phrases, properties to associate with the user-created response, an option to approve use of the response with other entities, or the like. Once a response is selected and optionally modified, or a new response is created, the updates are provided to the database for updating an existing entry or storage of a new entry. Thus, the UI 300 enables an entity (e.g., a manager of one or more MDUs) to dynamically manage responses of a virtual assistant from a user-friendly UI, instead of reprogramming code of the virtual assistant or using a database application to modify entries in a database.

Figure 4:
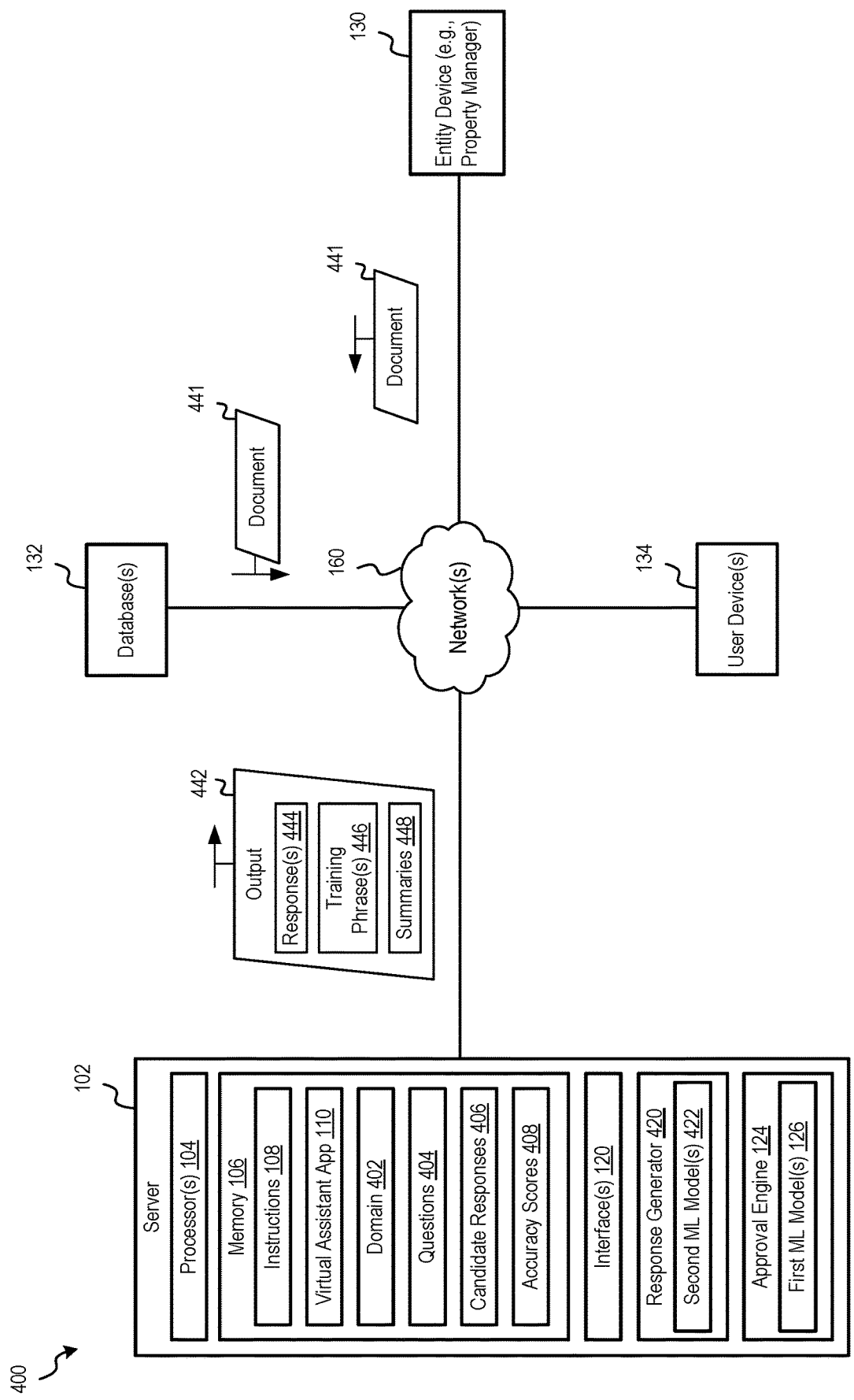
FIG. 4 is a block diagram of an example of a system that supports providing domain-specific responses to a virtual assistant associated with management of MDUs according to one or more aspects.

Referring to FIG. 4, a block diagram of an example of a system that supports providing domain-specific responses to a virtual assistant associated with management of MDUs according to one or more aspects is shown and designated 400. The system 400 may include or correspond to the system 100 of FIG. 1. For example, the system 400 includes the server 102, the entity device 130, the user device 134, and the databases 132. As further described below, the server 102, the entity device 130, the user device 134, or the databases 132 may include one or more additional components to enable performance of the operations described below. It is to be noted, however, that a system may include any or all of the components of the system 100 and the system 400, and accordingly a single system may perform some or all of the operations described herein with reference to FIG. 1 and FIG. 4.

As shown in FIG. 4, in addition to the processors 104, the memory 106, the communication interfaces 120, and the approval engine 124, the server 102 also includes a response generator 420. In some implementations, the response generator 420 includes or corresponds to a response generation module configured to generate responses based on input documents, as further described herein. The response generator 420 may be configured to generate one or more responses for use by the virtual assistant application 110 based on an input document and one or more domain-specific questions. For example, an input document may be associated with a domain (e.g., subject matter domain, document type domain, etc.), and the response generator 420 may be configured to analyze the input document to extract word(s), phrase(s), sentence(s), or the like, that are to be used as responses to a set of one or more questions that correspond to the domain, as further described herein. The response generator 420 may also be configured to generate one or more training phrases associated with the responses, one or more summaries associated with the responses, other information, or a combination thereof. In some implementations, the response generator 420 may be configured to initiate performance of an approval process before outputting the extracted responses, such as by providing the extracted responses to the approval engine 124 for approval, as described above with reference to FIG. 1.

In some implementations, the response generator 420 may include or access (e.g., at the memory 106, a storage device of the server 102, or a device that is coupled to or accessible to the server 102 via the one or more networks 160) a second set of one or more ML models (referred to herein as "the second ML models 422) that are configured to extract one or more responses from input documents based on domain-specific questions. For example, the second ML models 422 may include a single ML model or multiple ML models that are configured to extract (e.g., generate) responses. In some implementations, each ML model (or set of one or more ML models) of the second ML models 422 may be configured to extract responses for different domains of documents. For example, a first ML model of the second ML models 422 may be configured to extract responses from documents for questions associated with a first domain, and a second ML model of the second ML models 422 may be configured to extract responses from documents for questions associated with a second domain. Each of such ML models may be trained using training data based on questions and documents associated with a respective domain. Alternatively, the second ML models 422 may include multiple ML models (or sets of ML models) that are configured to extract responses from input documents associated with a variety of domains, depending on the domain of the input questions. In some implementations, the second ML models 422 may be implemented as one or more NNs. In some other implementations, the second ML models 422 may be implemented as other types of ML models or constructs, such as SVMs, decision trees, random forests, regression models, BNs, DBNs, NB models, Gaussian processes, HMMs, regression models, and the like. In some implementations, the second ML models 422 may include multiple configurations of ML models that each output a respective candidate response and accuracy score, and a final selection of responses to be output by the response generator 420 may be determined based on the accuracy scores.

During operation of the system 400, the server 102 may communicate with the entity device 130 to enable generation of responses to domain-specific questions based on input documents, with little to no user input (e.g., the response generation process may be automated or semi-automated). To illustrate, the server 102 may cause a UI to be output by the entity device 130, as further described with reference to FIG. 5, that enables the entity to select one or more documents for use in determining responses. Upon receipt of user input indicating a selected document, the entity device 130 may provide (e.g., send or transmit) a document 441 to the server 102. In some other implementations, the entity device 130 may enable selection, by the entity, of the document 441 stored at the databases 132 for providing to the server 102. The document 441 may be any type of document, such as a text document, an image, an electronic document (e.g., a PDF file), an audio file, a multimedia file, other types of documents, or the like. As an illustrative example, the entity device 130 may include or be coupled to a scanner or other image capture device, and the entity may cause a paper document, such as a copy of a lease, to be scanned or captures and provided to the server 102 as the document 441. As another illustrative example, the entity may read out loud the contents of a paper document, and the captured audio may be provided as the document 441.

After receiving the document 441 (e.g., an input document), the server 102 may provide the document 441 to the response generator 420. In some implementations, the server 102 may perform one or more conversion or pre-processing operations on the document 441 prior to providing the document 441 to the response generator 420. For example, the server 102 may perform optical character recognition (OCR) or the like on the document 441 to detect text in the document 441, one or more natural language processing (NLP) operations on the text to generate feature data, one or more automatic speech recognition (ASR) operations if the document 441 is in an audio-based format, other processing operations, or the like, to convert the document 441 into a format that is useable by the response generator 420 or the second ML models 422. Although described as being performed at the server 102, in some other implementations, one or more of the above-described operations may be performed at the entity device 130. Based on the conversion or pre-processing, the response generator 420 may determine a domain 402 associated with the document 441. The domain may be a document type, a subject-matter domain, another category or class of document, or the like. Illustrative examples of domains include leases, event schedules, pet policies, amenity rules, unit descriptions, contact information, and the like.

The response generator 420 may determine one or more questions 404 (e.g., domain-specific questions) based on the domain 402. As an illustrative example, if the domain 402 is amenity rules, the questions 404 may include "How many pools are onsite?", "What hours are common areas available for use?", "Are guests permitted in common areas?", "Are reservations required for common areas?", and the like. As another illustrative example, if the domain 402 is pet policy, the questions 404 may include "How many pets are allowed per unit?", "What is the pet fee for having a pet?", "Are pets allowed?", "Are there size or breed restrictions on pets?", and the like. In some implementations, the server 102 (e.g., the memory 106) may store a plurality of domains and corresponding domain-specific questions, and the questions 404 may be selected from the plurality of domain-specific questions based on identification of the domain 402. For example, the plurality of questions may be predefined during development of the virtual assistant application 110 or based on input from the entity device 130. In some other implementations, the domain 402, the questions 404, or both, may be received during the operational life of the virtual assistant application 110 from the entity device 130.

The response generator 420 may extract one or more candidate responses 406 from the document 441 based on the questions 404. In some implementations, the response generator 420 may be configured to apply one or more rules to the document 441 to generate the candidate responses 406. For example, if documents of a particular domain have a common, preset structure, one or more rules may be determined for analyzing and extracting particular information from such documents. Additionally or alternatively, at least a portion of the document 441 may be provided to a response specialist for analysis and response generation. In some implementations, the response generator 420 may provide the document 441 (or the resulting feature data) and the questions 404 as input to the second ML models 422, and the second ML models 422 may generate the candidate response 406. For example, the second ML models 422 may be trained to extract responses to questions from input documents, either for a particular domain or for multiple domains (e.g., based on the questions 404). In some implementations, the document 441 may be provided to a particular set of one or more ML models of the second ML models 422 that is configured to extract answers to questions (e.g., the questions 404) from documents having the domain 402. Alternatively, the second ML models 422 may be trained to extract responses from input documents based at least in part on input questions(s) (e.g., the questions 404). The candidate responses 406 may include one or more responses to the questions 404. For example, if the questions 404 include "How many swimming pools are on site?" and "What hours are common areas available?", the candidate responses 406 may include "The complex has a 100 square foot pool filled with crystal blue water and Olympic measurements" and "The pool is open 9:00 am to 9:00 pm Sunday-Thursday and 10:00 am to 11:00 pm Friday-Saturday."

As an illustrative example, the second ML models 422 may be trained to extract responses to the questions 404 from leases. In such an example, the questions 404 may include questions such as "How long is the lease term?", "What is the monthly payment?", "What is the penalty for breaking the lease?", "Is sub-letting permitted under the lease?", "Is property insurance required and in what amount?", and the like, and the questions 404 may have different answers for different leases due to differences in lease terms, differences in state and local regulations for different states, difference in residential and commercial leases, and the like. To generate responses for use by the virtual assistant application 110, the entity may provide multiple leases for different parties, from different states, etc., as input documents, and the leases (or feature data based on the leases) may be provided to the second ML models 422 for extracting the candidate responses 406. The second ML models 422 may be trained using training data based on leases associated with different terms, states, lessee types, etc., in order to configure the second ML models 422 to extract answers to the questions 404 even though the particular responses may be in different locations or have different formats in different types of leases. In this manner, the second ML models 422 may generate the candidate responses 406 instead of requiring the entity to manually enter information from each of the various leases.

In some implementations, the second ML models 422 may include multiple different sets of ML models configured to extract responses from input documents based on domain-specific questions, and each set of ML models of the second ML models 422 may be configured to generate respective accuracy scores. For example, the candidate responses 406 may include first responses generated by a first set of ML models of the second ML models 422, second responses generated by a second set of ML models of the second ML models 422, and third responses generated by a third set of ML models of the second ML models 422. Each of the responses may be associated with a respective accuracy score generated by the set of ML models. For example, the accuracy scores 408 may include a first accuracy score output by the first set of ML models, a second accuracy score output by the second set of ML models, and a third accuracy score output by the third set of ML models. The response generator 420 may select one or more of the candidate responses 406 based on the accuracy scores 408, and the selected responses may be output to the databases 132 as responses 444. In some implementations, the response generator 420 may select candidate responses that are associated with accuracy scores that satisfy (e.g., are greater than, or greater than or equal to) a threshold. For example, if the first accuracy score and the third accuracy score of the accuracy scores 408 satisfy a threshold, the responses 444 may include the first responses and the third responses of the candidate responses 406. In some other implementations, the response generator 420 may select a subset of the candidate responses 406 having a highest accuracy score(s).

In some implementations, after selecting the responses 444, the response generator 420 may initiate an approval process for the responses 444. For example, the responses 444 may be provided to the approval engine 124 for performing the approval process described above with reference to FIG. 1. In some such implementations, the approval process may include a manual approval process, an automated (or semi-automated) approval process, or a combination thereof, and may include receiving confirmation from the entity associated with the entity device 130 that the responses may be used for other entities, as described with reference to FIG. 1. Any of the outputs that do not satisfy the approval process may be discarded from the responses 444.

In some implementations, in addition to generating the responses 444, the response generator 420 may generate additional information associated with the responses 444, such as one or more training phrases 446, one or more summaries 448, other information, or a combination thereof. To illustrate, the response generator 420 may generate the training phrases 446 based on analysis of the responses 444, or the training phrases 446 may be associated with the questions 404 (e.g., training phrases associated with domain-specific questions may be predefined and stored at the memory 106 or received from the entity device 130 based on user input from the entity). Using the above-described examples of the questions 404 and the candidate responses 406, the training phrases 446 may include "available amenities," "information about pool," "size of pool," "amenity hours," and the like. Additionally or alternatively, the response generator 420 may generate the summaries 448 based on analysis of the responses 444 or the questions 404, or the summaries 448 may be associated with the questions 404 (e.g., summaries associated with domain-specific questions may be predefined and stored at the memory 106 or received from the entity device 130 based on user input from the entity). Using the above-described examples of the questions 404 and the candidate responses 406, the summaries 448 may include "pool details," "amenity policies," and the like.

The response generator 420 may generate an output 442 that includes the responses 444, the training phrases 446, the summaries 448, other information, or a combination thereof. The server 102 may provide the output 442 to the databases 132, and one or more entries may be added to the databases 132 based on the output 442. In some implementations, the output 442 may also include priority values associated with the responses 444. The priority values may be default values, or the priority values may be received from the entity device 130, as described above with reference to FIG. 1.

As described with reference to FIG. 4, the system 400 enables automated generation of responses for use by the virtual assistant application 110 based on input documents. By leveraging artificial intelligence and machine learning to enable automated generation of responses from input documents, the system 400 enables creation of relevant, specific responses with reduced (or eliminated) user input. For example, the entity associated with entity device 130 may have paper documents that contain information that is useful to be provided to current or potential customers, and the system 400 may enable generation of particular responses once the paper documents are scanned and provided to the server 102, instead of requiring the entity to manually enter each response.

Figure 5:
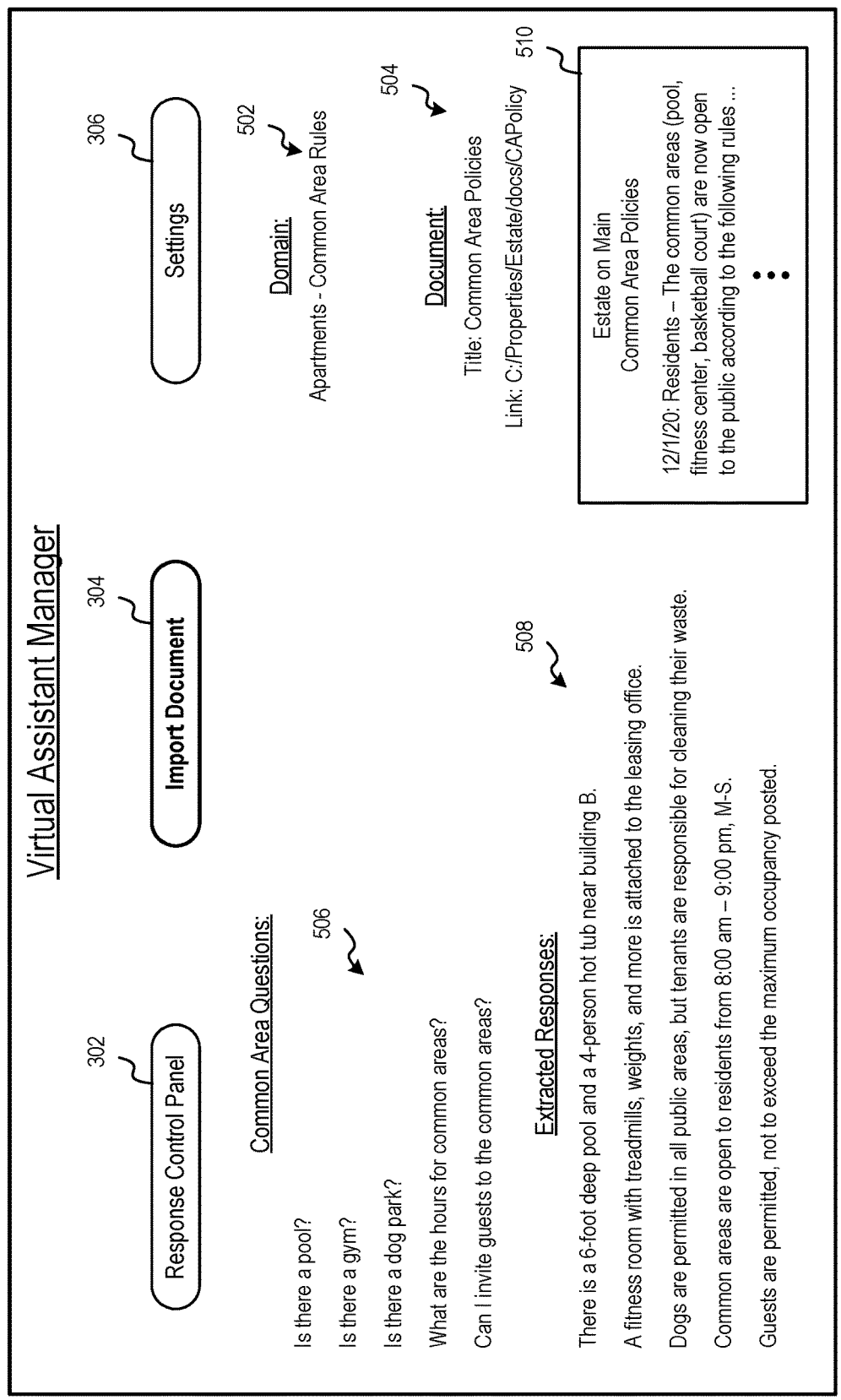
FIG. 5 is an example of a user interface that supports extracting domain-specific responses from a document according to one or more aspects.

Referring to FIG. 5, a UI that supports extracting domain-specific responses from a document according to one or more aspects is shown as a UI 500. The UI 500 (e.g., a GUI) may be displayed via a server (e.g., a display device coupled to the server) that executes a response generator, an administrator device (e.g., associated with a network administrator or a property manager), a user device (e.g., associated with a customer or client), or a combination thereof. In some implementations, the UI 500 may be displayed by the entity device 130 of FIG. 4. As shown in FIG. 5, the UI 500 includes the response control button 302, the import document button 304, the settings button 306, domain information 502, document information 504, one or more domain-specific questions 506, one or more extracted responses 508, and a document view 510. In other implementations, one or more of the illustrated features of the UI 500 may be optional, the UI 500 may include additional features, or both.

Upon selection of the import document button 304, the UI 500 may display the information shown in FIG. 5 for use in generating virtual assistant responses based on an input document. The domain information 502 may include information associated with a domain of an input document. As used herein, a domain may include or correspond to a category type of the input document. The domain may be selectable by a user of the UI 500 or may be automatically determined based on analysis of the input document. The document information 504 includes information associated with the input document. For example, the document information 504 may include a title of the input document, a location (e.g., a file path) of the input document, or the like. The input document may be selectable via the UI 500 or may be specified via other controls (e.g., for batch processing).

The domain-specific questions 506 may include questions that are related to the domain represented by the domain information 502. In the example shown in FIG. 5, the domain information 502 indicates a domain of common area rules for apartments and the domain-specific questions 506 include the following questions: "Is there a pool?", "Is there a gym?", "Is there a dog park?", "What are the hours for the common areas?", and "Can I invite guests to the common areas?" In some implementations, the domain-specific questions 506 may be associated with the domain information 502 and stored at a memory, such as a memory of a server or databases configured to store information related to virtual assistant(s). Alternatively, the UI 500 may include one or more input fields that enable a user to input one or more of the domain-specific questions 506.

The extracted responses 508 include one or more responses to the domain-specific questions 506 that are generated based on (e.g., extracted from) the input document associated with the document information 504 and the document view 510 may display at least a portion of the input document. As described above with reference to FIG. 4, the extracted responses 508 may be generated by application of one or more predefined rules to the input document, by providing the input document (or feature data based on the input document) to one or more ML models configured to extract domain-specific responses from input documents, using other techniques, or a combination thereof. In the example shown in FIG. 5, the extracted responses 508 that answer questions about common area rules include the following responses: "There is a 6-foot deep pool and a 4-person hot tub near building B," "A fitness room with treadmills, weights, and more is attached to the leasing office," "Dogs are permitted in all public areas, but tenants are responsible for cleaning their waste," "Common areas are open to residents from 8:00 am to 9:00 pm, M-S," and "Guests are permitted, not to exceed the maximum occupancy posted." Each of the extracted responses 508 are words, phrases, sentences, or the like that are included in the input document shown in the document view 510.

Thus, the UI 500 enables a user to select an input document for use in generating responses to be used by a virtual assistant. This process saves time, reduces human effort, and may reduce user error compared to requiring the user to manually enter each of the extracted responses 508. In this matter, electronic or paper documents may quickly and efficiently be converted to responses to be used by a virtual assistant with little to no user input, and without requiring a user to rewrite computer code of the virtual assistant or manual edit database entries.

Figure 6:
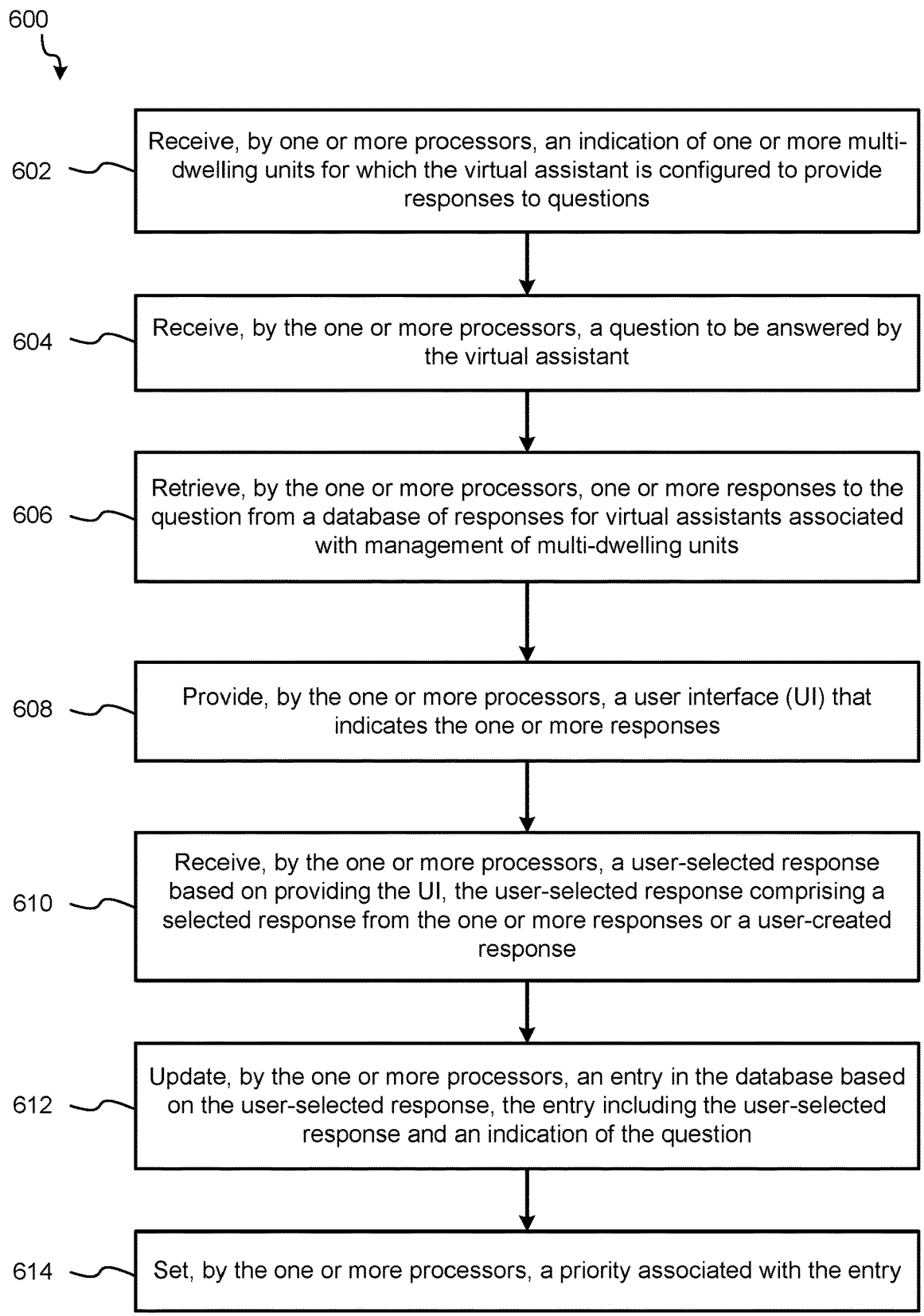
FIG. 6 is a flow diagram of an example of a method for dynamic management of responses for a virtual assistant associated with management of MDUs according to one or more aspects.

Referring to FIG. 6, a flow diagram of a method for dynamic management of responses for virtual assistants associated with management of MDUs according to one or more aspects is shown as a method 600. In some implementations, method 600 may be performed by the server 102 of FIG. 1. In some implementations, the method 600 may be stored in a computer-readable storage medium as instructions that, when executed by one or more processors, cause the one or more processors to perform the operations of the method 600.

At 602, the method 600 includes receiving an indication of one or more MDUs for which the virtual assistant is configured to provide responses to questions. For example, the indication may include or correspond to the indicator 140 of FIG. 1, and the virtual assistant may include or correspond to the virtual assistant application 110 of FIG. 1. At 604, the method 600 includes receiving a question to be answered by the virtual assistant. For example, the question may include or correspond to the question 142 of FIG. 1.

At 606, the method 600 includes retrieving one or more responses to the question from a database of responses for virtual assistants associated with management of MDUs. For example, the one or more responses may include or correspond to the responses 146 of FIG. 1. At 608, the method 600 includes providing a UI that indicates the one or more responses. For example, the entity device 130 of FIG. 1 may output the responses 146 via a UI, such as the UI 300 of FIG. 3.

At 610, the method 600 includes receiving a user-selected response based on providing the UI. The user-selected response includes a selected response from the one or more responses or a user-created response. For example, the user-selected response may include or correspond to the user-selected response 148 of FIG. 1.

At 612, the method 600 includes updating an entry in the database based on the user-selected response. The entry includes the user-selected response and an indication of the question. For example, updating the entry may include or correspond to the entry update 150 of FIG. 1. At 614, the method 600 includes setting a priority associated with the entry. For example, the priority may include or correspond to the priority 152 of FIG. 1.

In some implementations, the user-selected response includes the user-created response, and updating the entry includes creating the entry associated with the user-created response. For example, if the user-selected response 148 of FIG. 1 includes a user-created response, the entry update 150 may cause creation of a new entry at the databases 132. In some such implementations, the method 600 also includes initiating an approval process for the user-created response and associating the entry with one or more additional MDUs based on satisfaction of the approval process. For example, the approval engine 124 of FIG. 1 may initiate an approval process for the user-selected response 148 and, based on satisfaction of the approval process, an approval flag corresponding to the entry may be set (e.g., to indicate association with one or more other MDUs), as described above with reference to FIG. 2. In some such implementations, the approval process includes applying one or more predefined response rules to the user-created response. For example, the one or more predefined response rules may include or correspond to the response rules 112 of FIG. 1. Additionally or alternatively, the approval process may include providing the user-created response to one or more ML models to determine an approval rating associated with the user-created response, and the one or more ML models are configured to determine approval ratings based on input responses. For example, the one or more ML models may include or correspond to the first ML models 126 of FIG. 1, and the approval rating may include or correspond to the approval rating 114 of FIG. 1. Additionally or alternatively, the approval process may include providing the user-created response to a device associated with a system administrator for manual approval of the user-created response. For example, the user-selected response 148 of FIG. 1 may be provided to a device coupled to the server 102 for manual approval by a system administrator. Additionally or alternatively, the method 600 may further include setting a flag associated with the entry to indicate that the user-created response is not approved for use with other multi-dwelling units based on failure of the approval process. For example, an approval flag may be set to a particular value that indicates no approval, as described above with reference to FIG. 2.

In some implementations, the user-selected response includes the selected response from the one or more responses and updating the entry includes setting the priority of an existing entry associated with the selected response. For example, the user-selected response 148 of FIG. 1 may include one of the responses 146, and an associated entry may be updated by setting a priority based on the priority 152. Additionally or alternatively, the priority is set to a highest priority value for entries associated with the question and the one or MDUs. For example, the priority 152 of FIG. 1 may indicate a highest possible priority value associated with the question 142 or the one or more MDUs indicated by the indicator 140. Additionally or alternatively, the indication of the question includes one or more training phrases associated with the question. For example, the indication of the question 142 of FIG. 1 may include one or more training phrases, such as the training phrases 208, 226, and 246 of FIG. 2.

In some implementations, the method 600 also includes obtaining a document associated with the one or more MDUs, providing the document and one or more domain-specific questions associated with a domain corresponding to the document to one or more ML models to generate one or more domain-specific responses and one or more training phrases associated with the one or more domain-specific questions, the one or more domain-specific responses, or a combination thereof, and adding one or more entries to the database based on the one or more domain-specific responses and the one or more training phrases. For example, the document may include or correspond to the document 441 of FIG. 4, the one or more domain-specific questions may include or correspond to the questions 404 of FIG. 4, the one or more ML models may include or correspond to the second ML models 422 of FIG. 4, the one or more domain-specific responses may include or correspond to the responses 444 of FIG. 4, and the one or more training phrases may include or correspond to the training phrases 446 of FIG. 4.

In some implementations, the indication of the one or more MDUs may be received from a browser that accesses a link associated with the one or more MDUs. For example, the entity device 130 of FIG. 1 may execute a browser that accesses a link associated with particular MDUs, and the indicator 140 may be provided by the browser to the server 102. Additionally or alternatively, the indication of the one or more MDUs may be received by accessing a user profile associated with a user from which the question is received. For example, the indicator 140 may be determined by accessing a user profile associated with a user of the entity device 130.

Figure 7:
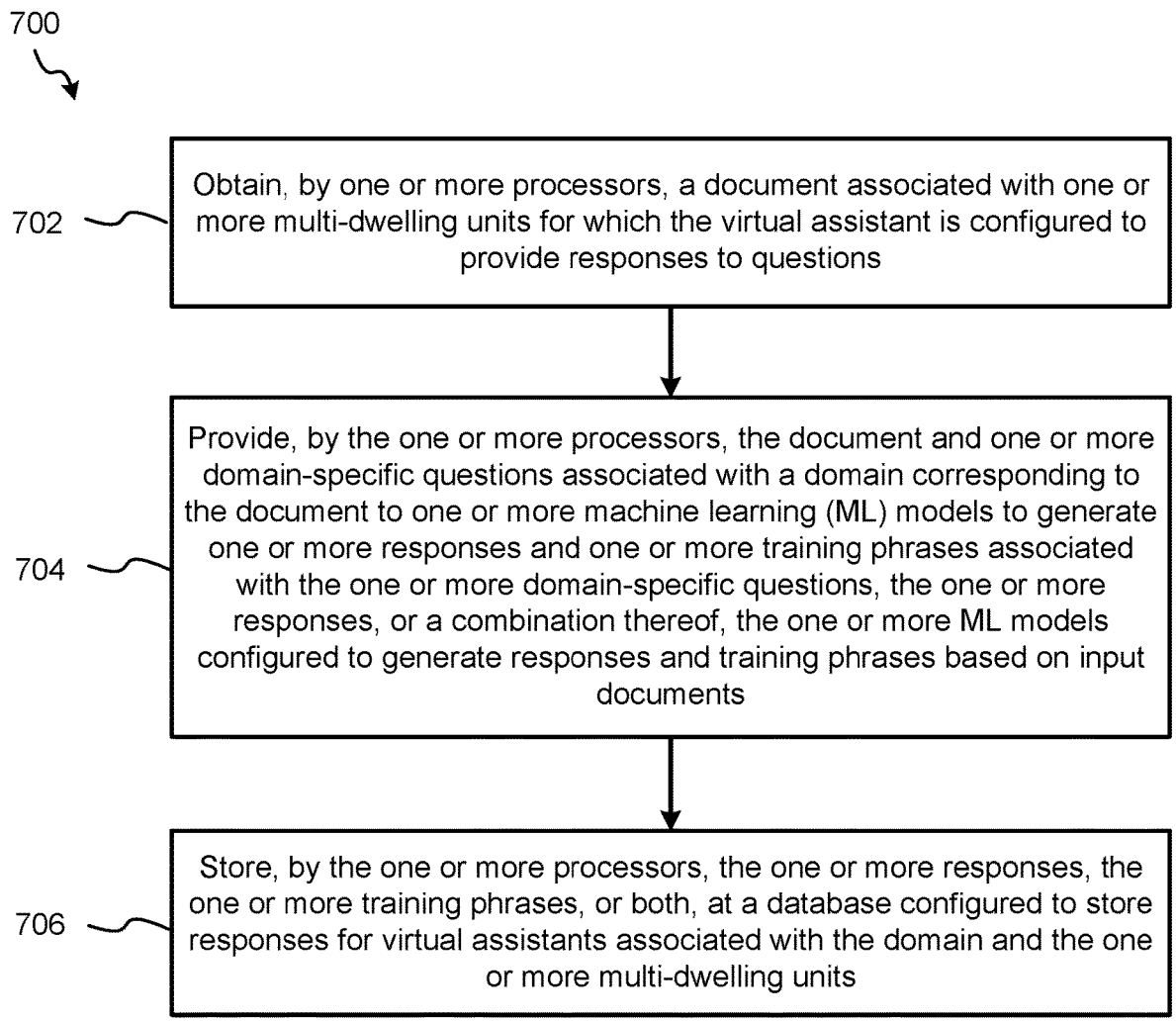
FIG. 7 is a flow diagram of an example of a method for providing domain-specific responses to a virtual assistant associated with management of MDUs according to one or more aspects.

Referring to FIG. 7, a flow diagram of a method for providing domain-specific responses to a virtual assistant associated with management of MDUs according to one or more aspects is shown as a method 700. In some implementations, method 700 may be performed by the server 102 of FIG. 4. In some implementations, the method 700 may be stored in a computer-readable storage medium as instructions that, when executed by one or more processors, cause the one or more processors to perform the operations of the method 700.

At 702, the method 700 includes obtaining a document associated with one or more MDUs for which the virtual assistant is configured to provide responses to questions. For example, the document may include or correspond to the document 441 of FIG. 4, and the virtual assistant may include or correspond to the virtual assistant application 110 of FIG. 4.

At 704, the method 700 includes providing the document and one or more domain-specific questions associated with a domain corresponding to the document to one or more ML models to generate one or more responses and one or more training phrases associated with the one or more domain-specific questions, the one or more responses, or a combination thereof. The one or more ML models are configured to generate responses and training phrases based on input documents (or feature data extracted from input documents). For example, the one or more domain-specific questions may include or correspond to questions 404 of FIG. 4, the one or more ML models may include or correspond to the second ML models 422 of FIG. 4, the one or more responses may include or correspond to the responses 444 of FIG. 4, and the one or more training phrases may include or correspond to the training phrases 446 of FIG. 4.

At 706, the method 700 includes storing the one or more responses, the one or more training phrases, or both, at a database configured to store responses for virtual assistants associated with the domain and the one or more multi-dwelling units. For example, the database may include or correspond to the databases 132 of FIG. 4.

In some implementations, the one or more ML models are further configured to generate summaries of the responses based on the input documents. For example, the summaries may include or correspond to the summaries 448 of FIG. 4. Additionally or alternatively, the one or more ML models include a plurality of ML models each configured to generate a respective set of responses and an accuracy score associated with the respective set of responses, and the one or more responses include a set of responses associated with a highest accuracy score from the plurality of ML models.

For example, the second ML models 422 may include multiple ML models configured to output the candidate responses 406 and the accuracy scores 408 associated with the candidate response 406.

In some implementations, the method 700 further includes initiating an approval process for the one or more responses. The one or more responses are stored at the database based on satisfaction of the approval process. For example, the approval process may be initiated by the approval engine 124 of FIG. 4. Additionally or alternatively, the domain corresponds to a document category of the document. For example, the domain may include or correspond to the domain 402 of FIG. 4, which may be a document category of the document 441.

In some implementations, methods can be combined with other operations described herein, for example, one or more operations of the method 600 of FIG. 6 may be combined with one or more operations of the method 700 of FIG. 7. Additionally or alternatively, one or more operations described with reference to one of the method 600 of FIG. 6 or the method 700 of FIG. 7 may be combined with one or more operations described with reference to FIGS. 1-5.

Although one or more of the disclosed figures may illustrate systems, apparatuses, methods, or a combination thereof, according to the teachings of the disclosure, the disclosure is not limited to these illustrated systems, apparatuses, methods, or a combination thereof. One or more functions or components of any of the disclosed figures as illustrated or described herein may be combined with one or more other portions of another function or component of the disclosed figures. Accordingly, no single implementation described herein should be construed as limiting and implementations of the disclosure may be suitably combined without departing from the teachings of the disclosure.

The steps of a method or algorithm described in connection with the implementations disclosed herein may be included directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient (e.g., non-transitory) storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

Although the present disclosure and its advantages have been described in detail, it should be understood that various changes, substitutions and alterations can be made herein without departing from the scope of the present disclosure as defined by the appended claims. Moreover, the scope of the present application is not intended to be limited to the particular aspects of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding aspects described herein may be utilized according to the present disclosure. Accordingly, the appended claims are intended to include within their scope such processes, machines, manufacture, compositions of matter, means, methods, or steps.

The invention claimed is:

1. A method for dynamic management of responses of a virtual assistant associated with management of multi-dwelling units or multi-family properties, the method comprising:
    receiving, by one or more processors from an entity, a user input indicating a question to be answered by the virtual assistant;
    retrieving, by the one or more processors, a plurality of responses to the question from a database of responses for virtual assistants associated with management of multi-dwelling units or multi-family properties, the plurality of responses associated with one or more properties that are included in the user input or indicated by a profile associated with the entity;
    providing, by the one or more processors, a user interface (UI) that indicates the plurality of responses in ranked order based on corresponding priorities;
    receiving, by the one or more processors, a user-selected response based on providing the UI, the user-selected response comprising a selected response from the plurality of responses;
    updating, by the one or more processors, an entry in the database based on the user-selected response, the entry including the user-selected response and an indication of the question;
    setting, by the one or more processors, a priority associated with the entry, where setting the priority associated with the entry comprises increasing the priority;
    obtaining, by the one or more processors, a document associated with the one or more properties, where the document is associated with a domain, and the domain is associated with one or more prestored domain-specific questions;
    providing, by the one or more processors, the document and the one or more prestored domain-specific questions to one or more machine learning (ML) models to generate one or more domain-specific responses;
    and adding, by the one or more processors, one or more entries to the database based on the one or more domain-specific responses.

2. The method of claim 1, further comprising:
    receiving, by the one or more processors, a user-created response;
    initiating, by the one or more processors, an approval process for the user-created response;
    and associating, by the one or more processors, another entry in the database with one or more additional properties based on satisfaction of the approval process.

3. The method of claim 2, where the approval process comprises applying, by the one or more processors, one or more predefined response rules to the user-created response.

4. The method of claim 2, where:
    the approval process comprises providing, by the one or more processors, the user-created response to one or more additional ML models to determine an approval rating associated with the user-created response, and
    the one or more additional ML models are configured to determine approval ratings based on input responses.

5. The method of claim 2, where the approval process comprises providing, by the one or more processors, the user-created response to a device associated with a system administrator for manual approval of the user-created response.

6. The method of claim 1, further comprising:
receiving, by the one or more processors, a user-created response;
initiating, by the one or more processors, an approval process for the user-created response; and
setting, by the one or more processors, a flag associated with another entry in the database to indicate that the user-created response is not approved for use with other properties based on failure of the approval process.

7. The method of claim 1, where:
the user-selected response comprises the selected response from the plurality of responses, and
updating the entry comprises setting the priority of an existing entry associated with the selected response.

8. The method of claim 1, where the priority is set to a highest priority value for entries associated with the question and the one or more properties.

9. The method of claim 1, where the user input includes one or more training phrases associated with the question.

10. The method of claim 1, further comprising:
adjusting, by the one or more processors, priorities associated with entries for other responses of the plurality of responses other than the selected response based on increasing the priority associated with the entry.

11. The method of claim 1, where:
the one or more ML models are further configured to generate one or more training phrases associated with the one or more domain-specific responses, and
at least one of the one or more entries added to the database includes the one or more training phrases.

12. The method of claim 1, where the one or more ML models are further configured to generate summaries of domain-specific responses based on input documents.

13. The method of claim 1, where:
the one or more ML models comprise a plurality of ML models each configured to generate a respective set of domain-specific responses and an accuracy score associated with the respective set of domain-specific responses, and
the one or more domain-specific responses comprise a set of highest scoring domain-specific responses from the plurality of ML models.

14. The method of claim 1, further comprising:
initiating, by the one or more processors, an approval process for the one or more domain-specific responses, where the one or more entries are added to the database based on satisfaction of the approval process.

15. The method of claim 1, where the domain corresponds to a document category of the document.

16. A system for dynamic management of responses of a virtual assistant associated with management of multi-dwelling units or multi-family properties, the system comprising:
at least one memory storing instructions; and
one or more processors coupled to the at least one memory, the one or more processors configured to execute the instructions to cause the one or more processors to:
receive, from an entity, a user input indicating a question to be answered by the virtual assistant;
retrieve a plurality of responses to the question from a database of responses for virtual assistants associated with management of multi-dwelling units or multifamily properties, the plurality of responses associated with one or more properties that are included in the user input or indicated by a profile associated with the entity;
provide a user interface (UI) that indicates the plurality of responses in ranked order based on corresponding priorities;
receive a user-selected response based on providing the UI, the user-selected response comprising a selected response from the plurality of responses;
update an entry in the database based on the user-selected response, the entry including the user-selected response and an indication of the question;
set a priority associated with the entry, where setting the priority associated with the entry comprises increasing the priority;
obtain a document associated with the one or more properties, where the document is associated with a domain, and the domain is associated with one or more prestored domain-specific questions;
provide the document and the one or more prestored domain-specific questions to one or more machine learning (ML) models to generate one or more domain-specific responses; and
add one or more entries to the database based on the one or more domain-specific responses.

17. The system of claim 16, further comprising an interface configured to communicate with the database to retrieve the plurality of responses and to update the entry.

18. The system of claim 16, where the one or more processors are configured to receive an indication of the one or more properties from a browser that accesses a link associated with the one or more properties.

19. The system of claim 16, where the one or more processors are configured to identify the one or more properties by accessing a user profile associated with the entity.

* * * * *